US007941762B1

(12) United States Patent
Tovino et al.

(10) Patent No.: US 7,941,762 B1
(45) Date of Patent: May 10, 2011

(54) DISPLAY OF REAL TIME INFORMATION FOR SELECTED POSSIBILITIES

(75) Inventors: Michael S. W. Tovino, Sandy, OR (US); Olaf D. K. Brandt, Palo Alto, CA (US); Jeffrey W. Ridley, Santa Clara, CA (US); Glen K. Okita, Los Altos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 866 days.

(21) Appl. No.: 10/367,673

(22) Filed: Feb. 14, 2003

(51) Int. Cl.
*G06F 3/048* (2006.01)
*G06F 15/16* (2006.01)
*G06F 3/01* (2006.01)
*G06F 3/00* (2006.01)
*G06F 13/00* (2006.01)
*H04M 11/00* (2006.01)
*H04M 3/42* (2006.01)

(52) U.S. Cl. ........ 715/816; 715/739; 715/708; 715/753; 715/751; 379/201.01; 379/93.17

(58) Field of Classification Search .................. 715/816, 715/739, 708, 753, 751; 379/201.01, 93.17
See application file for complete search history.

(56) References Cited

U.S. PATENT DOCUMENTS

| | | | |
|---|---|---|---|
| 5,845,300 A | 12/1998 | Comer et al. | |
| 5,923,737 A * | 7/1999 | Weishut et al. | 379/93.17 |
| 5,923,848 A | 7/1999 | Goodhand et al. | |
| 6,134,318 A * | 10/2000 | O'Neil | 379/266.01 |
| 6,192,118 B1 * | 2/2001 | Bayless et al. | 379/201.01 |
| 6,208,339 B1 | 3/2001 | Atlas et al. | |
| 6,247,043 B1 * | 6/2001 | Bates et al. | 709/200 |
| 6,279,016 B1 * | 8/2001 | De Vorchik et al. | 715/210 |
| 6,341,280 B1 * | 1/2002 | Glass et al. | 707/3 |
| 6,377,965 B1 | 4/2002 | Hachamovitch et al. | |
| 6,484,190 B1 * | 11/2002 | Cordes et al. | 707/3 |
| 6,539,421 B1 * | 3/2003 | Appelman et al. | 709/206 |
| 6,665,388 B2 * | 12/2003 | Bedingfield | 379/142.01 |
| 6,747,970 B1 * | 6/2004 | Lamb et al. | 370/352 |
| 6,791,583 B2 * | 9/2004 | Tang et al. | 715/751 |
| 6,829,607 B1 * | 12/2004 | Tafoya et al. | 707/6 |
| 6,968,052 B2 * | 11/2005 | Wullert, II | 379/210.01 |
| 7,184,527 B1 * | 2/2007 | Lin et al. | 379/93.17 |
| 7,313,760 B2 * | 12/2007 | Grossman et al. | 715/708 |

OTHER PUBLICATIONS

Ferranti et al.,AnswerSet unveils call tracker, May 10, 1993, PC Week. vol. 10,Iss.18;p. 39.*
BlackBerry Spy Software Hits the Market, Oct. 26, 2009, PR Newswire; New York.*

(Continued)

*Primary Examiner* — William L Bashore
*Assistant Examiner* — Jordany Núñez
(74) *Attorney, Agent, or Firm* — Silicon Valley Patent Group LLP; Omkar Suryadevara

(57) ABSTRACT

One or more possibilities that are normally displayed in response to input from a user are augmented with real time information. Displaying real time information for one or more of the possibilities enables the user to take such information into account in deciding whether or not to continue with an action that the user was in the process of performing. For example, if a partial data entry provided by the user is indicative of an extension number to be dialed to place a phone call, and if a telephone call manager that receives the user's input displays call activity indicating that the user's intended callee is already on the phone, the user may decide to wait until the callee becomes available (as indicated by a change in callee's call activity).

31 Claims, 27 Drawing Sheets

OTHER PUBLICATIONS

Milewski, A. E. et al. "Providing Presence Cues to Telephone Users", Proceedings of the 2000 ACM conference on Computer supported cooperative work, Dec. 2000, Philadelphia, PA, pp. 9.

Rosenberg, J. "Presence: The Best Thing That Ever Happened to Voice", http://www.callcentermagazine.com/shared/article/showArticle.jhtml?articleId=8700975, Nov. 5, 2000, pp. 3.

Sells, C. "Windows Telephony Programming; A Developers Guide to TAPI", Addison Wesley, 1998, ISBN: 0201634503, pp. 1-20; 21-37; 39-77.

Day, M. et al., "A Model for Presence and Instant Messaging", http://www.potaroo.net/ietf/all-ids/draft-ietf-impp-model-02.txt, Feb. 23, 2000, pp. 13.

Chapter 23 "TAPI Architecture" of a book "MAPI, SAPI, and TAPI Developer's Guide", by Amudsen, M., Macmillan Computer Publishing, 1996, ISBN:0672309289, pp. 20.

Chapter 30 "Creating TAPI-Enabled Applications" of a book "MAPI, SAPI, and TAPI Developer's Guide", by Amudsen, M., Macmillan Computer Publishing, 1996, ISBN:0672309289, pp. 52.

Q&A: Instant Messaging Milestone for Real-Time Communications Strategy, http://www.microsoft.com/presspass/features/2002/dec02/12-09rtcommunications.mspx, Redmond, Wash., Dec. 9, 2002, pp. 4.

Fout, T. "Integrating Windows Real-Time Communications into Applications", http://msdn2.microsoft.com/en-us/library/ms997631.aspx, Jan. 15, 2002, pp. 5.

IETF Charters Extensible Messaging and Presence Protocol (XMPP), Working Group, http://xml.coverpages.org/ni2002-11-04-a.html, Nov. 4, 2002, pp. 3.

Shoreware Software (slide presentation), 15 pages, believed to be prior to Feb. 2003.

ShoreWare™ Call Manager Software, Shoreline3, Version 3.0, Aug. 22, 2001, Document Version 1.3, 6 pages.

ShoreWare™ Call Manager Software, Release 2.0, Oct. 6, 2000, Version 1.7, 6 pages.

ShoreWare—WorkGroup Call Manager, 4 pages, believed to be prior to Feb. 2003.

ShoreWare™ Call Manager Software, Shoreline3, Release 3.1, Dec. 14, 2001, Document Version 1.3, 8 pages.

Shoreline Personal Call Manager Help, total of 18 pages, believed to be prior to Feb. 2003.

Shoreline Desktop Call Manager Help, 8 pages, believed to be prior to Feb. 2003.

* cited by examiner

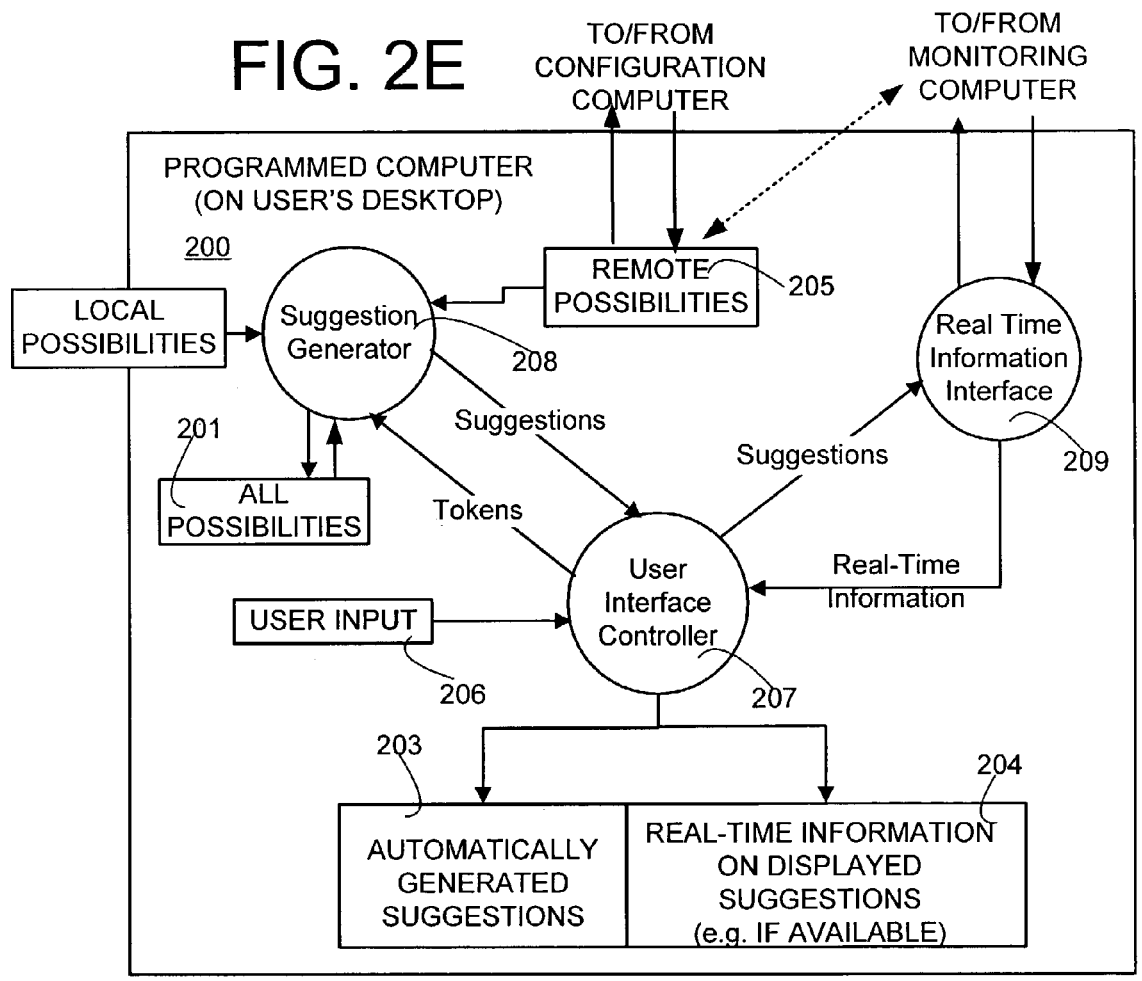

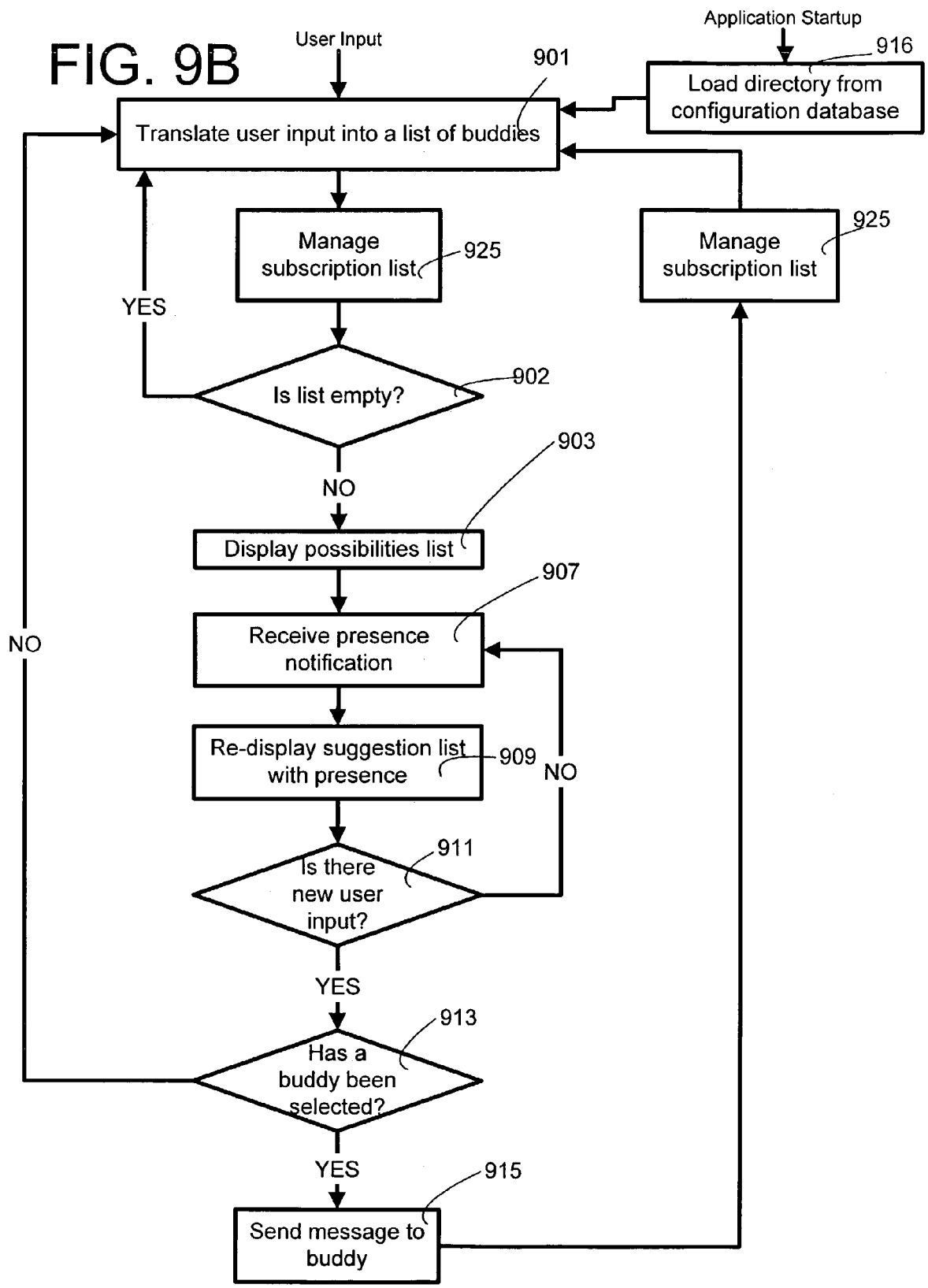

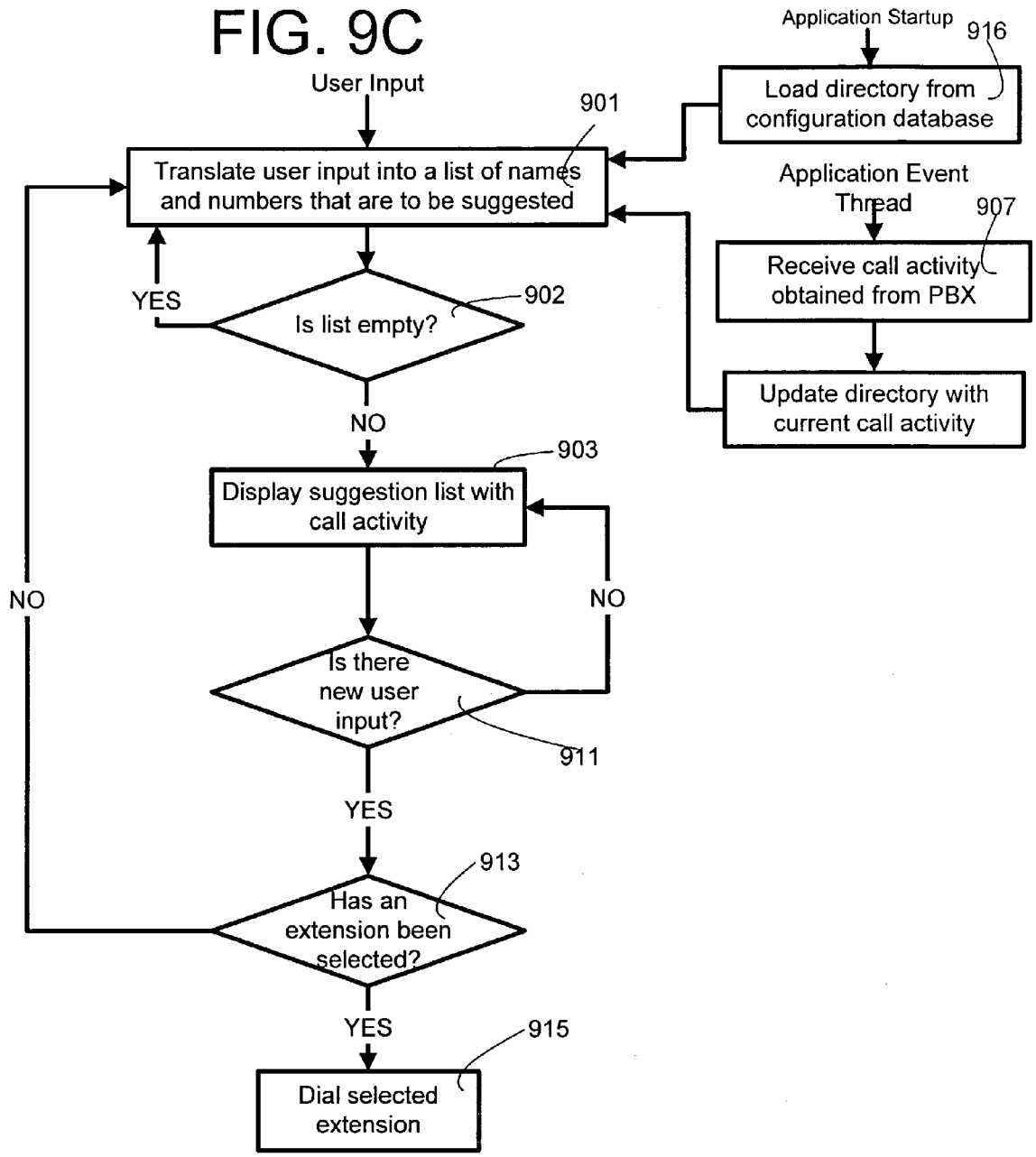

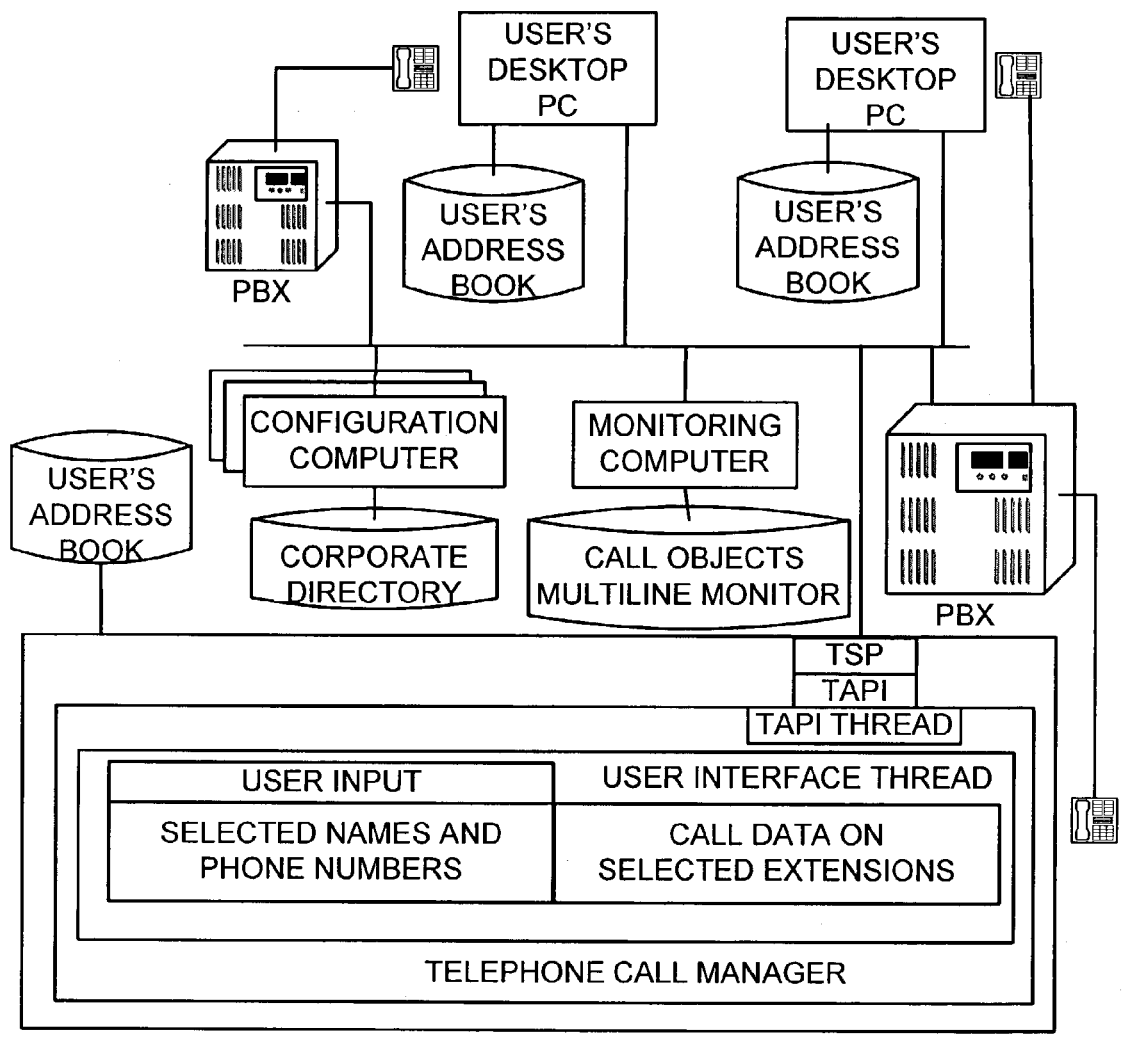

DISPLAY OF REAL TIME INFORMATION FOR SELECTED POSSIBILITIES

CROSS-REFERENCE TO COMPUTER PROGRAM LISTING APPENDIX

Appendices A-R are contained in the following files in one CD-ROM (of which two identical copies are attached hereto). Each of Appendices A-R is an integral part of the present disclosure and each appendix is incorporated by reference herein in its entirety.
Volume in drive D is 030214_2015
Volume Serial Number is AEA4-7B29

```
 Directory of D:\
02/12/2003   01:17p           1,259 A.TXT
02/13/2003   03:55p           3,867 B.TXT
02/12/2003   01:53p           1,615 C.TXT
02/13/2003   08:00a           2,959 D.TXT
02/14/2003   09:22a         199,912 E.TXT
02/14/2003   09:26a         544,684 F.TXT
02/14/2003   09:44a         416,783 G.TXT
02/14/2003   11:40a             326 H.TXT
02/14/2003   11:41a             355 I.TXT
02/14/2003   11:42a             804 J.TXT
02/14/2003   11:44a             304 K.TXT
02/14/2003   11:47a           1,316 L.TXT
02/14/2003   11:49a             680 M.TXT
02/14/2003   11:50a             497 N.TXT
02/14/2003   11:54a             394 O.TXT
02/14/2003   11:56a             468 P.TXT
02/14/2003   01:01p          70,681 Q.TXT
02/14/2003   01:31p           4,902 R.TXT
             18 File(s)   1,251,806 bytes
              0 Dir(s)             0 bytes free
```

The files of Appendices A-D and H-P contain pseudocode for certain methods implemented in an apparatus that interfaces with a user in accordance with the invention. Appendices E-G contain software source code in the language C++ which illustrate functions and data structures that implement the pseudocode in Appendices A-D and H-P. Appendix Q contains portions of source code that implement various functions and data structures in another apparatus that interacts with the above-described apparatus in accordance with the invention. Appendix R contains pseudocode and related data structures for an alternative embodiment of the above described apparatus to use an Instant Messaging client in accordance with the invention.

The methods illustrated in these appendices A-R can be used to program a client computer and a server computer that contain Microsoft Corporation's Windows (which may be 98 or SE or 2000) operating system, e.g. Workstation or Professional for the client computer and Server for the server computer.

COPYRIGHT NOTICE

A portion of the disclosure of this patent document contains material that is subject to copyright protection. The copyright owner has no objection to the facsimile reproduction by anyone of the patent document or the patent disclosure, as it appears in the in the Patent and Trademark Office patent files or records, but otherwise reserves all copyright rights whatsoever.

BACKGROUND

As illustrated in FIG. 1A, Microsoft Corporation's INTERNET EXPLORER version 4.0 is a software program that contains an AutoComplete feature that dynamically suggests a match for an Internet address, as the address is typed into an address bar by a user. Specifically, as when the user types just two characters "go" (FIG. 1A), the AutoComplete feature suggests the closest matching files and/or websites that contain this string of two characters. The AutoComplete feature makes suggestions by completing the address or command being typed with the nearest match, while the user is still typing. The nearest match is determined by examining a History folder, and/or the contents of a user-specified folder, and/or a list of most recently typed addresses or commands (which are stored in the registry). To accept a match displayed in the address bar, the user simply presses ENTER. The user can click the down arrow button on the keyboard to display a list of suggestions, and select from the list.

In versions 5.0 and 6.0 of the INTERNET EXPLORER, the AutoComplete feature displays suggestions in a list as soon as a familiar pattern is recognized (see the list illustrated in FIG. 1A). If a suggestion in the list matches what the user was typing, the user simply clicks the suggestion. Alternatively, the user may press the DOWN ARROW key to select a suggestion, and then press ENTER. If none of the suggestions displayed in the list are appropriate, the user may simply continue to type in the address bar. Therefore, when an additional character "s" is typed into the address bar (see FIG. 1B), the AutoComplete feature dynamically updates the list of suggestions, with closest matches that contain the three character string "gos".

In addition to implementation in the address bar illustrated in FIGS. 1A and 1B, the AutoComplete feature is also implemented in the Open box for the Open command on the File menu in Internet Explorer. Moreover, the AutoComplete feature is also available in the Open box for the Run command on the Start menu in the Windows Explorer, which is part of the Windows NT operating system available from Microsoft Corporation.

Microsoft's OUTLOOK software program also contains a similar feature which is illustrated in FIG. 1C. OUTLOOK allows a user to locate an E-mail address when only a fragment of a name is known. For example, if the user knows a person's last name (or just the first initial), the user can enter as much of the name as is known (e.g. 3 characters), with the components separated by spaces. OUTLOOK tries to match the information provided by the user against the beginning of Last and First names in the Address Book. Outlook matches the provided information in any order, so "Stan A" or "A Sta" both find Stanier, Alan M. A similar feature, which is illustrated in FIG. 1D is provided in another software program from Microsoft Corporation, called OUTLOOK EXPRESS.

For more information on such technologies being supplied by Microsoft Corporation, see, for example, U.S. Pat. Nos. 5,845,300, 5,923,848, and 6,377,965 all of which are incorporated by reference herein in their entirety. In addition, U.S. Pat. No. 6,208,339 (which is also incorporated by reference herein in its entirety) describes providing a user interface for data entry with user changeable autocomplete functions for data entry fields.

Instant Messaging ("IM") software programs are commonly used to by users to communicate with one another, and one such program supplied by YAHOO! Inc. is illustrated in FIG. 1E. IM programs inform each user of the status of one or more other users (with whom the user is likely to communicate), prior to establishing communication. For example, as illustrated by icons 105 in FIG. 1E, the information that is typically provided is whether a person in the user's "buddy list" (see list 103 in FIG. 1E) is typing on the keyboard and/or whether that person is already busy with another IM communication.

Icons 105 indicate to a current user that is desirous of initiating a communication, the current "presence" of persons on the buddy list (who are preselected as being of interest to the current user). Icons 105 change in a dynamic manner (e.g. if a person returns to their desk and starts typing their icon is changed from "away" to "present"). Icons 105 are normally used to predict the likelihood that an invitation for an IM session will be accepted.

The IM "buddy list" is typically displayed in a folder list (e.g. user names are grouped under one or more folders that in turn may be grouped under one or more additional folders), although a search bar 101 is also provided in some IM programs. We, the inventors have not personally come across any reference that discloses or suggests the use of an AutoComplete feature with search bar 101 of FIG. 1E.

AT&T has developed an application called "live addressbook" which is designed to help users make informed telephone calls from anywhere, via their wireless PDA or desktop browser. Unlike other network-based address books, which maintain static information, the live addressbook can display dynamic information about where the recipient currently is (i.e., reach number), and how available he/she currently is for calls. The system accomplishes this by applying to telephony the "Buddy List" concepts made popular in Instant Messaging applications.

For more information on "live addressbook", see an article entitled "Providing Presence Cues to Telephone Users" by Allen E. Milewski and Thomas M. Smith published in the Proceedings of the 2000 ACM conference on Computer supported cooperative work December 2000, Philadelphia, Pa., and available at a URL obtained by replacing "-" with "." and by replacing "%" with "/" in the following string "http:%%home-att-net%~amilewski%liveabmilewski-pdf"
This article is incorporated by reference herein in its entirety.

An article entitled "Presence: The Best Thing That Ever Happened To Voice" by Jonathan Rosenberg in Computer Telephony, published Nov. 5, 2000 is incorporated herein by reference in its entirety. This article is available over the Internet at a URL obtained by replacing "-" with "." and by replacing "%" with "/" in the following string "http:%%www-computertelephony-com/article%CTM20001023S0001." According to this article, a new service that presence could support is a modernized "attendant console." Attendant consoles are common on PBX systems; they let the operator (also called the attendant) see the phone status of every extension connected to the PBX. Unfortunately, these consoles are limited. They can only monitor phones connected to the PBX and the console itself must be attached to the PBX.

According to this article, one can view an attendant console as a simple form of presence as well. Consider the possibilities for this simple application when real presence is used. The console can be a PC application. It can monitor people, rather than devices (therefore including cell phone, work phone, and VoIP phone in the status), and can manage anyone in the world willing to publish their presence information. The console itself can be run from anywhere, and more than one console can run on the same body of people, or on a subset or superset, without coordination. Consider the mobility benefits—the console attendants can now work from home and still manage the phone system in the enterprise, even monitoring the status of company employees who are telecommuting.

Also well known in the art is, for a front desk operator in an organization, to receive calls from outside the organization, and transfer them via a PBX to an employee who is identified after the operator talks to the caller. Such an operator may be provided with a computer that has been programmed to display the status of all phones in the organization as illustrated in FIG. 1F. Note that the operator is provided with status of not just one extension identified by the operator, but the call state of all extensions in the organization.

The just-described software also provides an operator interface for transferring a call (see FIG. 1G), wherein the operator can type in a character string followed by a delimiter (such as a space or tab). In response to the operator input that is non-numeric, the operator interface automatically highlights within a displayed list of status of all extensions, the first extension with a first name that matches the character string. No matching is performed on last names or partial extension numbers. If the character string is numeric, the full extension must be entered to highlight a single matching item in the list. Moreover, regardless of how many matches are present, the status of all extensions is displayed. The extensions that are displayed in the transfer screens are listed under a tab labeled "Extensions" (which is one of several tabs). The operator console also displays the following additional tabs: personal directory, system directory, and call history and dialer. None of these additional tabs display real time status information.

The operator console of FIG. 1G highlights at most a single line in a transfer screen, as described above. The real time status is displayed continuously for all items in the list regardless of any input from the operator. If the operator input is anything other than a first name, then nothing is changed in the list (i.e. all items in the list continue to be displayed as before and without any highlighting).

We the inventors note that in the operator console of FIG. 1G other partial matches are neither highlighted, nor are they displayed adjacent to one another or adjacent to the first highlighted line.

SUMMARY

In accordance with the invention, one or more possibilities that are normally displayed in response to input from a user (also called "user input") about an action to be performed are augmented with additional information on the one or more possibilities. The additional information that is used to augment the suggestions is likely to change over time (e.g. call activity changes over the duration of a phone call, which can last several minutes, whereas quantity of a part in inventory may change over a number of days). Such additional information (which changes over time) is also referred to as "real time information."

The user input is automatically used by an appropriately programmed microprocessor (e.g. in a desktop computer, a laptop computer or a handheld device) or a microcontroller (e.g. in a phone that conforms to the Internet Protocol (IP phone) or a cell phone) to identify certain possibilities that are to be displayed to the user, from among all possibilities that a user is likely to identify (for performance of the action) via the user input. Displaying real time information for one or more of the possibilities being displayed enables the user to take such information into account in deciding whether or not to continue with the action that the user was in the process of initiating when providing the user input.

The user input may be received via any data input device, such as a pointing device (e.g. a mouse, a joystick, a trackball, a touchpad), or a text-entry device (e.g. keyboard of a computer, keypad of a telephone, or a screen of a hand-writing recognition tablet, a microphone of a voice recognition device). In certain embodiments wherein a text input is provided by the user, a dialog box is displayed to the user and the user types a partial text entry by touching one or more keys on the keyboard and in response characters representing the keys are automatically displayed in the dialog box. Furthermore, a string of one or more characters being provided by the user is used by a microprocessor/microcontroller to select one or more suggestions as being likely to represent a completed data entry and display the selected suggestions to the user along with real time information for each displayed suggestion (if real time information is available for the displayed suggestion). Depending on the embodiment, the selection and display by the microprocessor/microcontroller may be done automatically (e.g. after each keystroke) or in response to receipt of a predetermined delimiter character (e.g. space/tab/enter) in the user input, or after a predetermined time delay in receipt of user input (e.g. quarter second after receipt of a character).

In several embodiments wherein a mouse is used to provide user input, a user navigates a directory of folders (typically organized in a hierarchical manner) to manually select a folder that itself contains one or more items that are to be displayed to the user. In accordance with the invention, such manually-selected items are displayed along with real time information for each displayed item (if real time information is available for the displayed item). In variants of the just-described embodiments, a user's manual selection of a folder causes the microprocessor/microcontroller to perform a search and display results of the search (which identify items that are in addition to any items already present in the folder). In such variants, the microprocessor/microcontroller sends a query over a global network (such as the Internet) or a local network (such as a corporate-wide intranet), displays items identified in responses to the query. In these variants as well, real time information is displayed to the user along with each displayed item (if real time information is available for the displayed item).

In several embodiments, the real time information is obtained only after the one or more possibilities are identified for display (or in some embodiments only after the selected possibilities are displayed), so that the amount of information that is collected (to be displayed to the user) is limited to the selected possibilities. However, other embodiments may obtain real time information for one or more possibilities prior to receiving a user's input (e.g. if such possibilities are likely to be of interest to the user, determined based on previously-selected possibilities) and the real time information that is obtained is not displayed until selected possibilities are identified.

In some embodiments, a user provides input via a dialog box (also called "dialer bar") of a software program for managing telephone calls that has been programmed into a computer (or into an IP phone) in an organization (which may be corporate or non-corporate organization). The software program (also called "telephone call manager") may be used to place either a telephone call outside the organization (e.g. by dialing 9) or an internal call (e.g. by directly dialing an extension number), via a telephony switch (such as a private branch exchange "PBX") that services the organization. Such a telephone call manager of some embodiments is also indicative of one or more incoming calls, and provides assistance to the user in managing phone calls.

In such embodiments, a list of suggestions that are displayed in response to a user's keystrokes on a keyboard (or a keypad) includes names and numbers of persons (hereinafter "likely callees") that are likely being now called by the user. If the list of likely callees includes at least one person in the organization, the real time information that is displayed for such a person includes call activity on that person's telephone line. Also, in such embodiments, the telephone call manager obtains for display to the user, only the call activity of persons in the organization who are also on the 1st of likely callees (i.e. the call activity of all persons in the organization is not obtained and displayed).

In one embodiment, the telephone call manager displays to the user (who's initiating a call) the call activity of persons who (1) are likely being now called by the user and (2) have real time information available from a telephony switch in the organization. For example, in a row in the likely callee list that contains a name from a corporate directory, one of the following icons is displayed for the respective call activity: if a call is in progress an "off-hook" icon is displayed (meaning the phone is busy), if the phone is ringing a "speaker" icon is displayed (meaning the handset has not yet been picked up), and if there are no calls an "on-hook" icon is displayed (meaning the phone is idle). In the just-described example, if a row in the likely callee list contains a name which is not in the corporate directory, then no icon is displayed (because there is no real time information available for such external callees). In embodiments wherein an external telephony switch (e.g. a wireless service provider, a central office switch, or a PBX switch in another organization) is configured to provide real time information on such external callees, then an appropriate icon is displayed. Although three icons have been described for one embodiment, other embodiments may have fewer icons or more icons. For example, some embodiments may have, in addition to the just-described icons, another icon which indicates that the phone is in the process of dialing a number (or name).

In the above-described embodiment, depending on the displayed icon, a user who is initiating a call may decide to continue with making the call (e.g. if there are no calls), or may decide to delay making the call (e.g. if the phone is ringing or if a call is already in progress). Depending on the situation, the user may decide to continue with making a new call even if a callee already has a call currently in progress, in which case the callee may respond by putting their in-progress call on hold, and answering the new call. In certain embodiments, the organization discourages users from making a new call if a callee's phone is currently ringing due to an incoming call, so as to allow the callee to handle the incoming call (thereby to eliminate confusion otherwise arising from trying to handle two or more incoming calls simultaneously).

Some embodiments, in addition to (or instead of) displaying the state of one or more calls being handled by a callee, may display in the callee list the number of calls that are either currently in progress or are in the process of being made to a callee. For example, if a callee in the organization has one call on hold and is currently on another call, then the number "2" is displayed in a row containing that callee's name in the callee list. In another example, if a callee has one call on hold, and is currently on another call, and if yet another call is ringing then the number "3" is displayed in the suggestion list, in-line with the callee's name and phone number. In such embodiments, an organization may encourage users to delay placing their call if the number of calls to a callee is displayed as being greater than or equal to 1.

Note that a telephone call manager of the type described herein may be implemented in a computer or in an IP phone on a desktop of a large number of users (e.g. all employees) in any organization (such as a manufacturer of diapers or cars).

Although one embodiment related to a telephone call manager is described above, numerous other embodiments will be apparent to the skilled artisan in view of this disclosure.

For example, an instant messenger application displays a dialog box to a user (who's initiating an instant messaging session) for receipt of a string of characters indicative of persons who are likely being now contacted for establishing an instant messaging session; and the instant messenger displays one or more suggestions and also displays real time information (e.g. information available from a telephone exchange and/or from an instant messaging server). Depending on the embodiment, the source of such real time information may be any server on a global network, or may be limited to a server within an organization to which the user belongs (e.g. a corporation), or limited to a server that services users having service agreements with a single Internet service provider such as AOL or telephony service provider such as SBC. In the just described example, other such embodiments may display a folder list instead of or in addition to the dialog box. Also, variants of such embodiments may be implemented in an email application instead of or in addition to the instant messenger application.

In another example of the types of embodiments that are encompassed by the invention, a supply chain management application displays a dialog box for a user to order supplies of parts that are being used in an assembly line in a factory, and in response to a partial text entry by a user, a list of part numbers are automatically identified and displayed to the user and furthermore, in a row of each part number, real time information on the quantity of the suggested part currently in inventory is also displayed.

BRIEF DESCRIPTION OF THE DRAWINGS

FIGS. 2C-1 illustrates, in a high-level block diagram, a microprocessor or microcontroller that interacts with a configuration computer and with a monitoring computer in accordance with the invention.

FIGS. 2C-2 illustrates, in a high-level flow chart, acts performed by the microprocessor/microcontroller of FIGS. 2C-1 to implement some embodiments of the invention.

FIG. 2E illustrates, in an intermediate-level block diagram, an alternative embodiment of the computer of FIG. 2D.

FIGS. 3B-1 and 3B-2 illustrate, in graphical user interfaces (GUIs), two alternative implementations of the block diagram of FIG. 3A.

FIGS. 9A-9C illustrate, in flow charts, acts performed in several embodiments of the invention, to generate one or more GUIs described above.

FIG. 11 illustrates, in a high level block diagram, various computer of the type described herein that are used in one specific implementation of an embodiment that displays call activity in conjunction with automatically generated suggestions in response to a user's partial text entry.

DETAILED DESCRIPTION

Figure 2A:
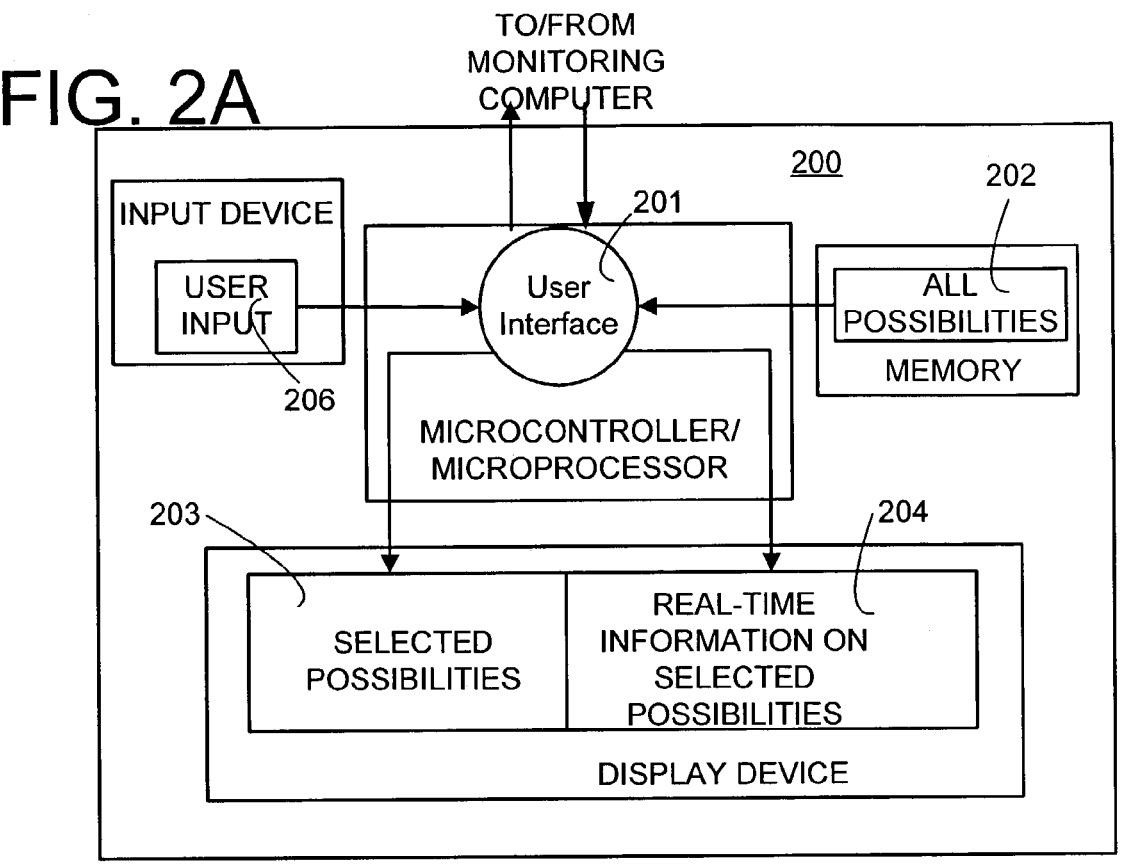
FIG. 2A illustrates, in a block diagram, an autocompletion dialog box in accordance with the invention which responds to user input with a display of suggestions and a display of real time information on the suggestions.

In certain embodiments of the invention, a user interface 201 (FIG. 2A) is equipped with functionality to automatically generate suggestions, such as an autocompletion feature of the type well known in the art. User interface 201 receives a partial data entry (also called "user input") from a user (e.g. in the form of a string of characters or a set of characters separated from one another), and the just described functionality automatically checks the received user input against a set of all possibilities 202 (e.g. all telephone extensions in an organization), to find one or more matches. The matches are thereafter displayed as suggestions 203 and in addition real time information 204 on selected suggestions 203 is also displayed. The suggestions for which real time information is displayed are selected from a set of monitorable possibilities 205 (FIG. 2D).

Limiting the display of real time information 204, based on context provided by a user (in the form of matching user input) has the advantage of not requiring the display of all the real time information that may be available for all monitorable possibilities 205. Instead, real time information 204 that is to be displayed to the user is limited to only those matches that are being suggested to the user by the autocompletion feature, and also that are known (ahead of time) to be monitorable. Embodiments of the type illustrated in FIG. 2A eliminate the need to collect real time information for all monitorable possibilities, and also eliminate a confusing display resulting from displaying real time information for all monitorable possibilities.

For example, if a database of a corporation holds the names and phone numbers of 20,000 employees, it is not necessary for a telephone call manager of the type described herein to find out the real time information of all 20,000 employees. Instead, the real time information is collected in accordance with this invention in a "just-in-time" manner. In some embodiments, the real time information is collected only for employees whose phone numbers and/or names are being suggested to the user. In other embodiments, the real time information is collected only for employees that have just been identified by the user (e.g. by selecting a folder).

In an example, a user types in "5" (which is identified in FIG. 2B by reference numeral 212), in a dialer bar 211 of a telephone call manager 210. In response, telephone call manager 210 generates a list of suggestions 214, each having a phone number that begins with "5". Examples of such phone numbers are extension "502" for Alotta Fagina, "500" for Austin Powers, 504 for Doctor Evil, 599 for Evil Empire. Suggestions 214 are displayed in a control 213 (such as a drop-down list box or pop-up window) that also contains real time information 215. The real time information 215 of this example includes an icon indicative of call activity, such as on-hook, off-hook and ringing.

Figure 2B:
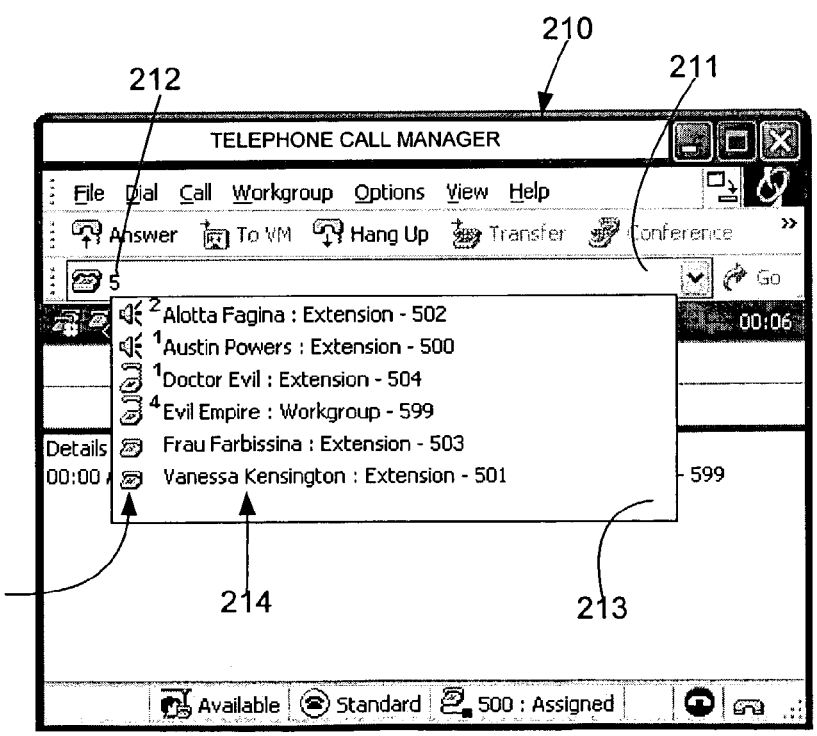
FIGS. 2B and 2C illustrate, in graphical user interfaces (GUIs), two examples of an autocompletion dialog box of the type illustrated in FIG. 2A, in alternative embodiments of the invention.
Figure 2C:
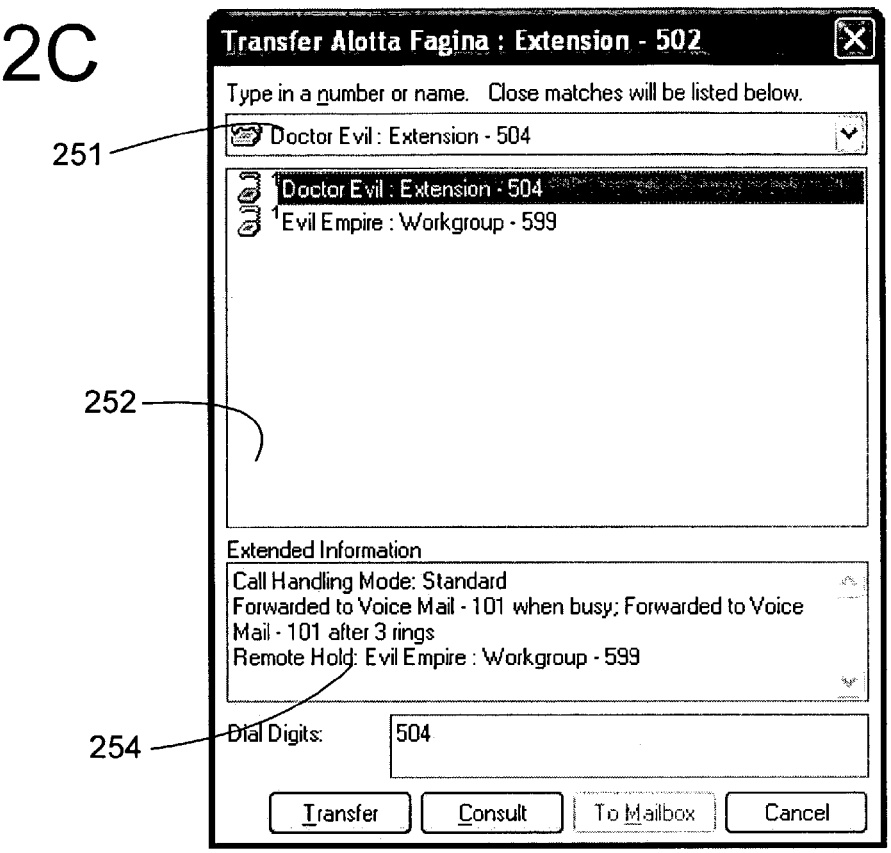
Figures 1, 2C:
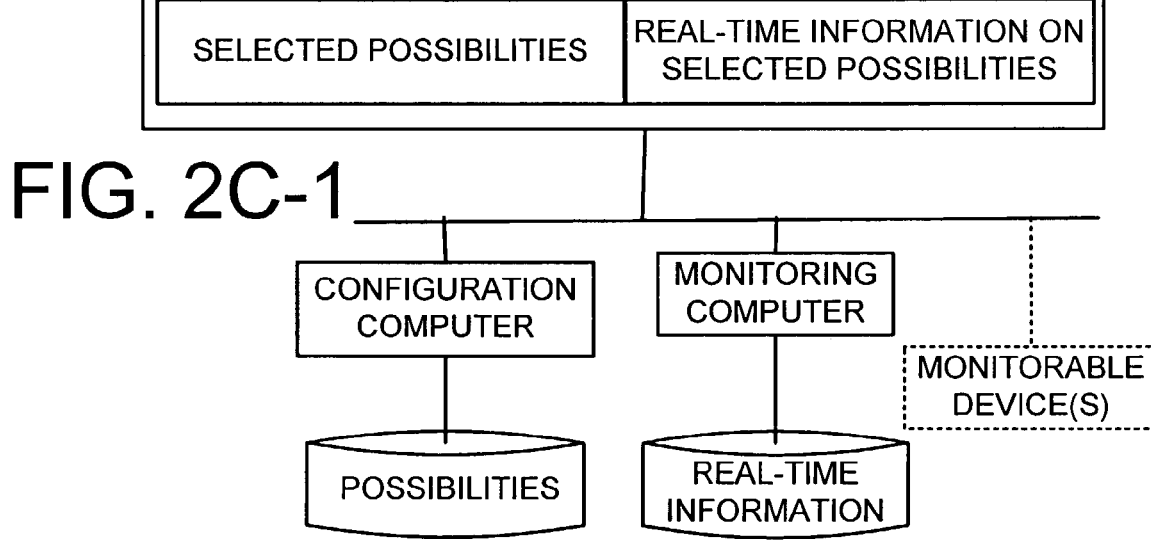

Although the above example illustrated in FIG. 2B refers to a "drop down" list box or pop-up window for displaying suggestions, alternative embodiments may display suggestions (and not display possibilities) in a window 252 that is fixedly located adjacent to a dialog box 251 (in which the user provides input), as illustrated in FIG. 2C.

Referring to FIG. 2B, Austin Powers has one incoming call, and for this reason a speaker icon is displayed. Dr. Evil is calling someone (e.g. Austin Powers) and hence an off-hook icon is displayed. The reason for differentiation is that if someone has an incoming call currently, the user could decide to not confuse them by calling there or transferring another call there.

Note that an incoming call is not established yet between the caller and the callee, and hence technically it is not a call because it's just ringing. In FIG. 2B, Austin Power's phone is ringing whereas Dr. Evil is already talking. Moreover, in FIG. 2B, Alotta Fagina has two calls: at least one of which is incoming (i.e. not established yet), and the other could be incoming or in progress. It is easy to put someone on hold without losing them if a person (e.g. the user) currently has a call. If the person currently has two incoming calls, then it gets confusing: the callee is likely to miss at least one of the two simultaneously incoming calls.

The embodiment illustrated in FIG. 2B uses more than one icon to indicate an active state of a callee's phone: one icon to indicate ringing, and another icon to indicate call-in-progress. Note that in other embodiments, there may be more than two icons to indicate active state, e.g. (a) ringing (b) call-in-progress and (c) call-being-dialed.

Furthermore, although in FIGS. 2B and 2C, the real time information is displayed as icons that are separate and distinct from the corresponding suggestions, in other embodiments these two kinds of information may be integrated together. For example, instead of icons, colors may be used to highlight the suggestions: "on-hook" state may be displayed by coloring the related suggestion with a "green" highlight, "off-hook" state may be displayed by coloring the related suggestion with a "yellow" highlight, and the "ringing state" may be displayed by coloring the related suggestion with a "red" highlight (wherein the three colors have meanings similar to the corresponding three colors of a traffic light). Alternatively, in other embodiments such states may be displayed as words of text.

Several embodiments of the type illustrated in FIGS. 2A and 2C dynamically identify a set of suggestions from among all possibilities 202, by invoking a suggestion generator 208 (FIG. 2D). Therefore, a request for real time information is sent out by some embodiments (e.g. via a real time information interface 209) only after identifying a set of monitorable suggestions from among all automatically generated suggestions 203. Other embodiments do not filter the list of suggestions to find monitorable suggestions and instead simply send out a request for real time information for each suggestion. For example, an embodiment that implements an instant messenger application sends a request for real time information on all suggestions (if an autocompletion feature generates suggestions) or on all items (if navigation of a directory of folders results in selection of a particular folder).

Suggestion generator 208 may be implemented in any manner well known in the art for generating suggestions based on a partial data entry by a user. Note that suggestion generator 208 may maintain and use a local store of all possibilities 202, and optionally a store of monitorable possibilities 205.

Moreover, real time information interface 209 may also be implemented in any manner well known in the art for generating real time information on items that can be monitored. For example, real time information interface 209 may communicate with another computer (called "monitoring computer") that is directly connected to the items to be monitored (e.g. a telephone switch).

In one illustrative embodiment which is described more completely below, user interface controller 207 and suggestion generator 208 are implemented in one thread and real time information interface 209 is implemented in another thread. In this embodiment, the two threads are both implemented in a single application, such as telephone call manager.

Moreover, all possibilities 202 and monitorable possibilities 205 may be obtained at the start up of the user interface, e.g. from a computer (called "configuration computer") wherein such information has been stored ahead of time. The configuration computer may access local information from a database, or it may access distributed configuration information via a network, e.g. from a directory server (LDAP). If the configuration of possibilities changes, the updates are propagated in some embodiments to suggestion generator 208 so that they are available without restarting the user interface. There may be more than one configuration computer, and all possibilities 202 may contain a combination of possibilities from more than one configuration computer.

A local configuration may also supply information for all possibilities 202. That is, all possibilities may be comprised of any combination of local and remote possibilities.

Depending on the embodiment, a single computer may be programmed to perform the functions of both a monitoring computer and a configuration computer. Furthermore, although certain embodiments use two different data structures (used to access main memory of the programmed computer), for all possibilities 202 and for monitorable possibilities 205, in other embodiments the data may be integrated together into a single data structure. For example, such other embodiments may have a single data structure wherein a record for each possibility contains not only the identity of the item but also a field indicative of whether or not the item is monitorable.

Therefore, several embodiments of the type described herein use contextual information from the user to decide ahead of time (i.e. prior to sending the request for real time information) what items to monitor, and hence such a request for real time information is generated on a just-in-time basis. This is in contrast to filtering after getting the real time information, which is time consuming, and requires memory to hold the real time information for all the monitorable possibilities.

Figures 2, 2C:
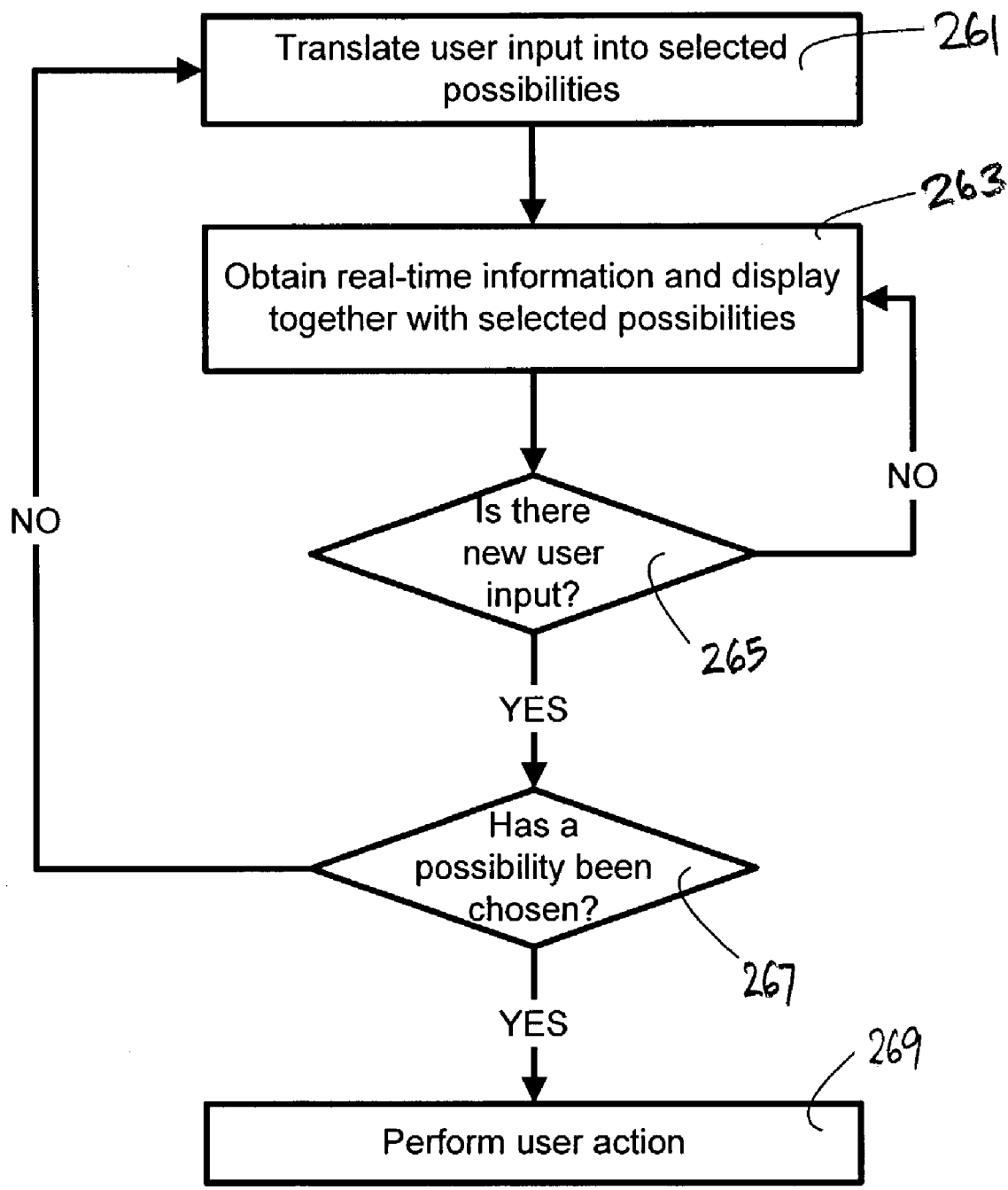
Figure 2D:
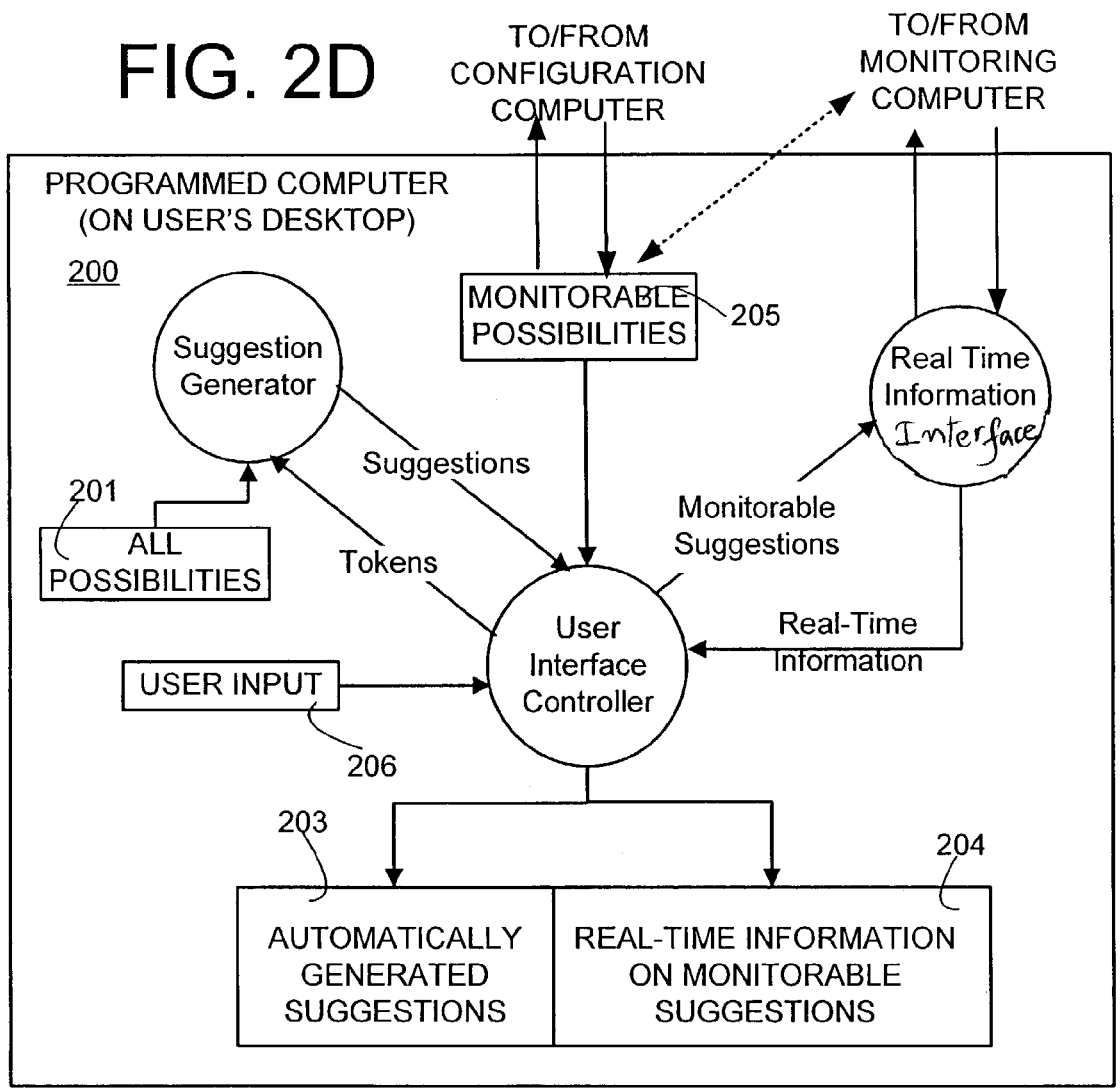
FIG. 2D illustrates, in an intermediate-level block diagram, various components inside a computer that has been programmed in accordance with the flow chart of FIGS. 2C-2 to implement: a user interface controller 207, a suggestion generator 208 and a real time information interface 209.

An illustration of the steps performed to display real-time information with selected possibilities is FIGS. 2C-2. When user input is obtained, act 261 produces a collection of selected possibilities relevant to the user action. The selected possibilities may be obtained by comparing user input to a list of all possibilities or a partial list of possibilities. The selected possibilities may be generated from other data that is not in the form of a list.

Once a set of selected possibilities has been obtained, act 263 obtains real-time information (if available) and displays said information together with the selected possibilities. If there is no further user input in act 265, information may be redisplayed showing updated real-time information when it is available. Further user input results in either an change of selected possibilities or making a choice of one of the selected possibilities in act 267. Choosing one of the selected possibilities results in the desired user action 269.

Figure 3A:
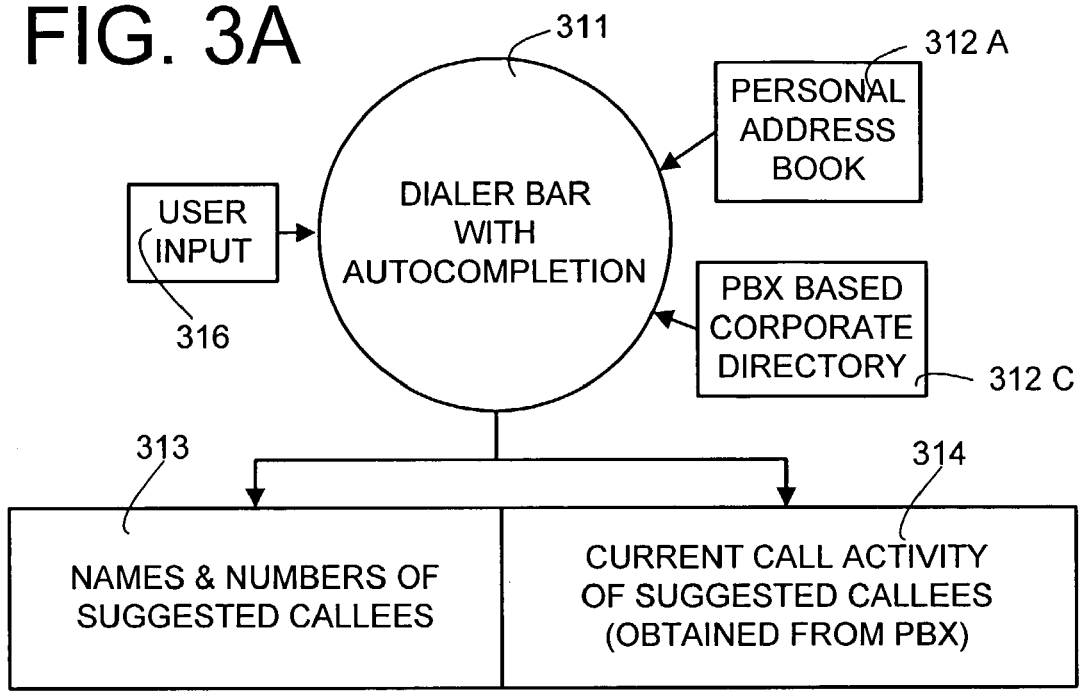
FIG. 3A illustrates, in a block diagram, a telephone call manager embodiment, wherein an autocompletion dialer bar displays a list of names & numbers of suggested callees and also displays call activity of suggested callees if they are in a PBX-based corporate directory.

Referring to FIG. 3A, in an embodiment of the invention as a telephone call manager, user input 316 is received in a dialer bar 311 which automatically generates suggestions based on a corporate directory 312C of employee names and phone numbers. Such a corporate directory 312C (which may be PBX based and is system wide) is used by dialer bar 311 in addition to a personal address book 312A that is independently maintained by the user.

Figure 3B:
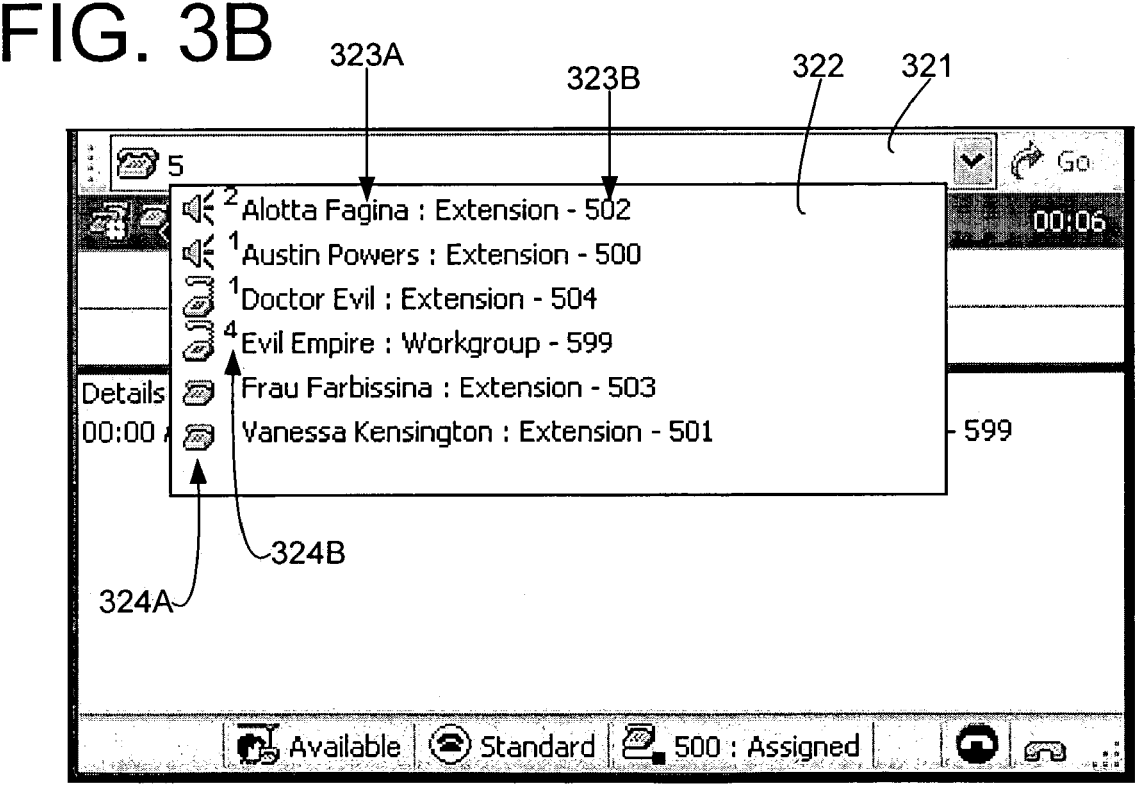
FIG. 3B illustrates, in a graphical user interface (GUI), one implementation of the block diagram of FIG. 3A.
Figures 2, 3B:
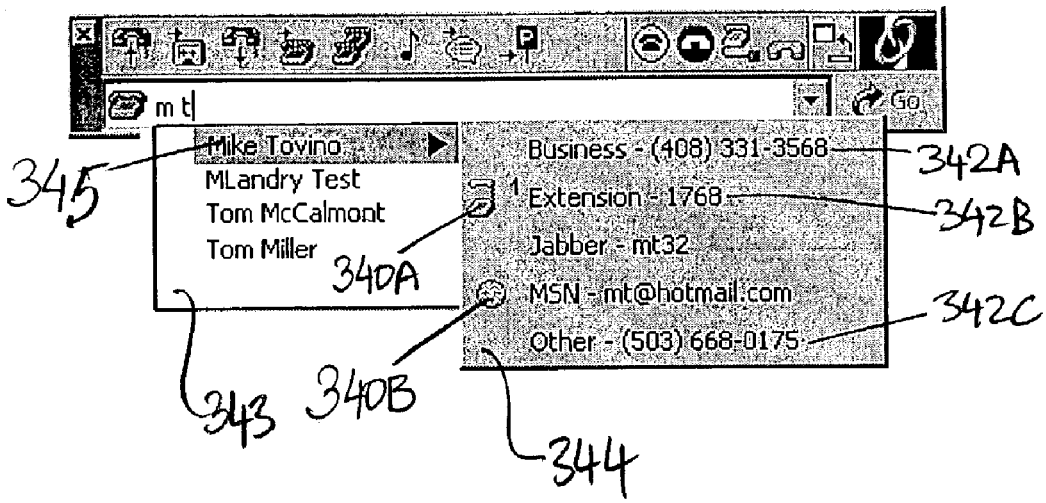
Figures 1, 3B:
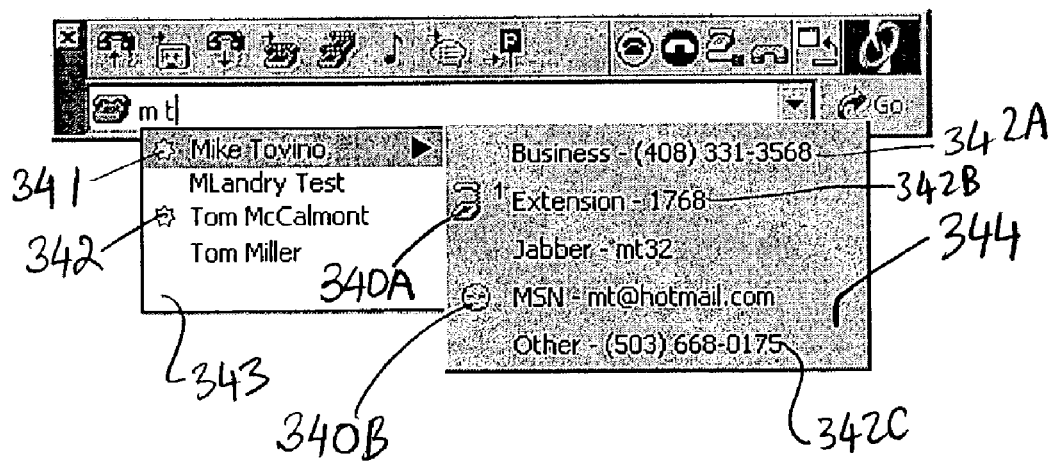

Dialer bar 311 generates several names and phone numbers 313 of callees that have a possibility of being called by the user (based on the user input 316). If any of names and numbers 313 happens to be in the corporate directory 312C, then for such names and numbers call activity 314 is obtained from the switch. Because the number of matches is a very small subset of the total number of items in the corporate directory 312C, the call activity 314 is obtained very quickly (as compared to obtaining call activity for all entries in the corporate directory 312C). The call activity 314 is then displayed with the suggestions, e.g. as illustrated in FIG. 3B.

In one embodiment, the corporate directory 312C is loaded into the dialer using a client/server connection. This function is further illustrated in FIG. 3E. An address book client 331 requests all address book entries from an address book server. In one embodiment, the address book client is a COM object that initiates an HTTP request to an Web Server 332A, where the request is handled by an IIS ISAPI extension 332B. The ISAPI extension is an address book server that makes a query to the system configuration database 333. The query returns a record set that includes: Extension number, Voice mail number, Business phone number, Home phone number, Cell phone number, Pager number, Fax number, First name, and Last name.

This information, and any additional information from the query, is formatted into an HTTP response and returned to the address book client. The address book client uses the name and phone information to create a corporate directory which is to be used, for example, in making suggestions. In particular, the extension number is used to determine whether real-time information may be available. In one embodiment, real-time information is only available for phone numbers that are extensions, and not for other numbers (e.g. not for telephone numbers outside the organization).

If there are changes to the configuration database, they are also passed to the client via HTTP request/response notifications. In this case, the client makes an HTTP request and the server does not return until updated data is available, or until a timeout occurs. If a timeout occurs, the client repeats the request so that it may receive future configuration changes.

Specifically, referring to FIG. 3B, a user enters their input in dialer bar 321, and a dropdown list box 322 is automatically generated to display suggestions as well as real time information. Note that in the embodiment illustrated in FIG. 3B, list box 322 contains two kinds of static information: callee name 323A, and extension 323B. Moreover, list box 322 also contains two kinds of real time information: call state 324A and number of calls 324B.

The number of calls indicates how busy the potential callee is currently. For example, in FIG. 3B the first suggestion named "Alotta Fagina" is currently handling two calls, because the number "2" is displayed between the speaker icon and the first suggested name. Since the speaker icon is also displayed, at least one of the two calls is just ringing and the other call may be also ringing or alternatively the other call may be currently in progress or may be on hold.

Similarly, in FIG. 3B, the second row in the suggestion list contains the name "Austin Powers" shown with real time information, which is indicated as having a single call that is ringing (because the speaker icon is shown). In the third row, Doctor Evil has a single call which is currently in progress. Finally, in the fourth row, a work group called Evil Empire is shown as having 4 calls (e.g. these 4 calls could be calls that are currently queued waiting for call support from a human operator). As noted above, in such embodiments, an organization may encourage users to delay placing their call if the number of calls to a callee is displayed (as per FIG. 3B) as being greater than or equal to 1.

Figure 3C:
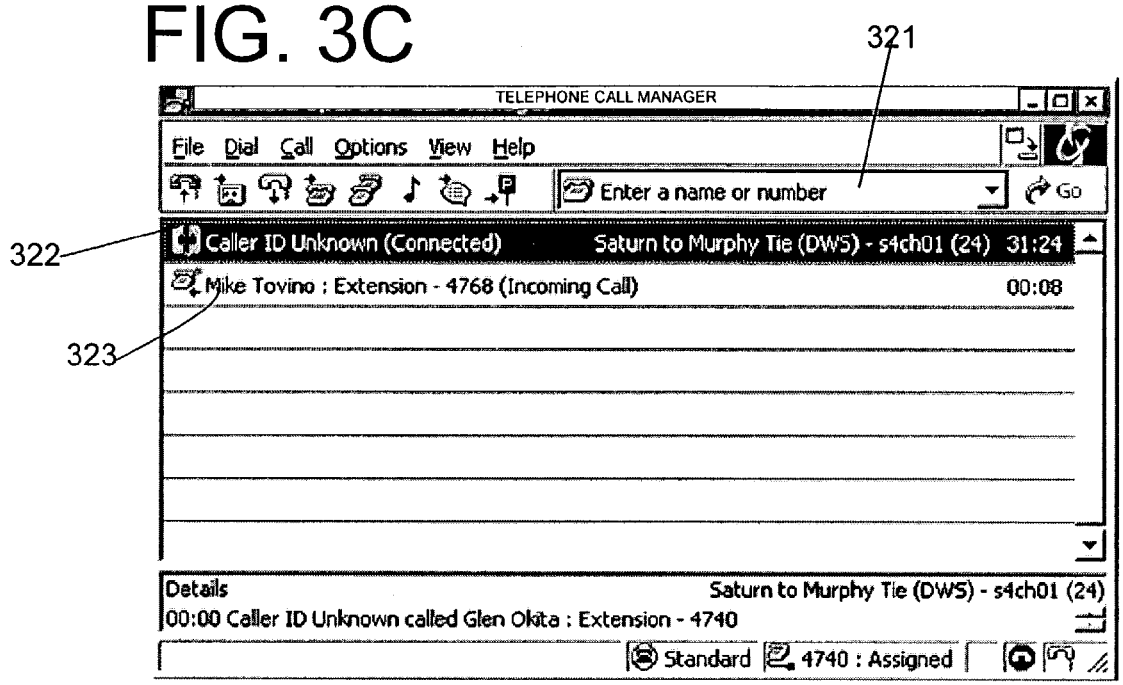
FIGS. 3C and 3D illustrate, in a graphical user interface, certain aspects of one embodiment of a telephone call manager, of the type illustrated in FIG. 3B.
Figure 3D:
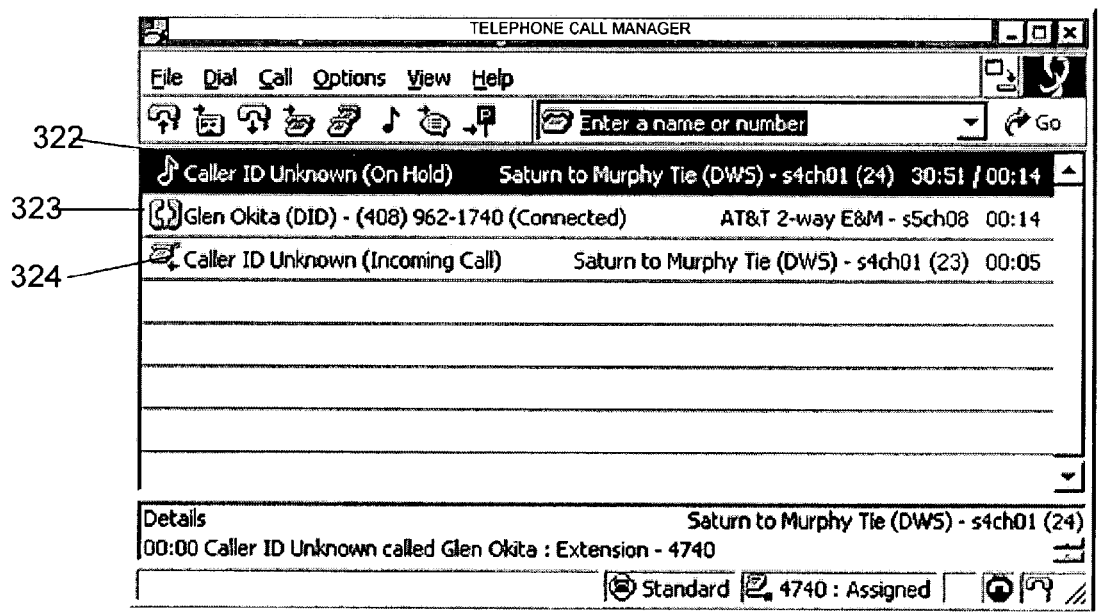
Figure 3E:
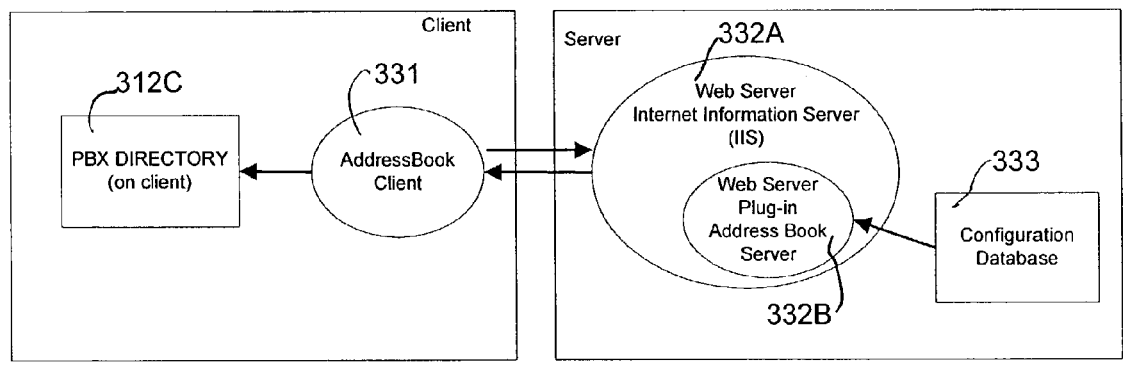
FIG. 3E illustrates, in a block diagram, a client-server model for a user's computer to obtain configuration information from a configuration computer.

Note that the above-described telephone call manager also supports functionality to receive phone calls as illustrated in FIG. 3C. Specifically, while a call is in progress (as per row 322), another call is shown in row 323 as incoming from "Mike Tovino. Therefore, at this stage the user (whose name is "Glen Okita") may decide to answer Mike's call and does so by placing the first call (as per row 322) on hold, as illustrated in FIG. 3D. As soon as Mike's call is answered, the call state is re-drawn, now shown as "connected" in row 323 in FIG. 3D. At this time yet another call may come in as per row 324 in FIG. 3D.

Figure 4A:
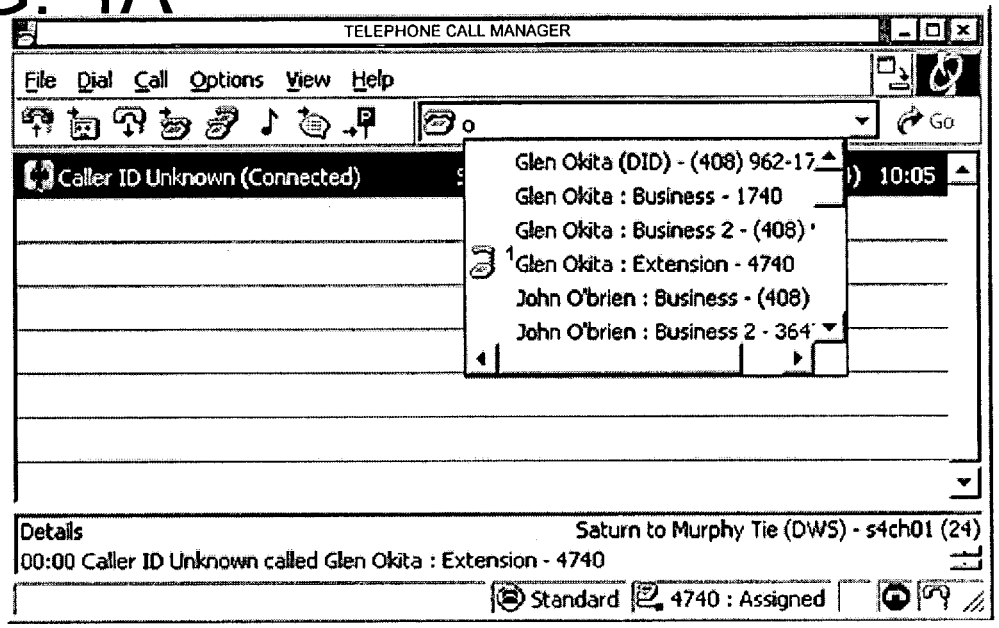
FIGS. 4A-4G illustrate, in graphical user interfaces (GUIs), operation of autocompletion dialer bar in response to various user inputs in certain embodiments of the invention.
Figure 4B:
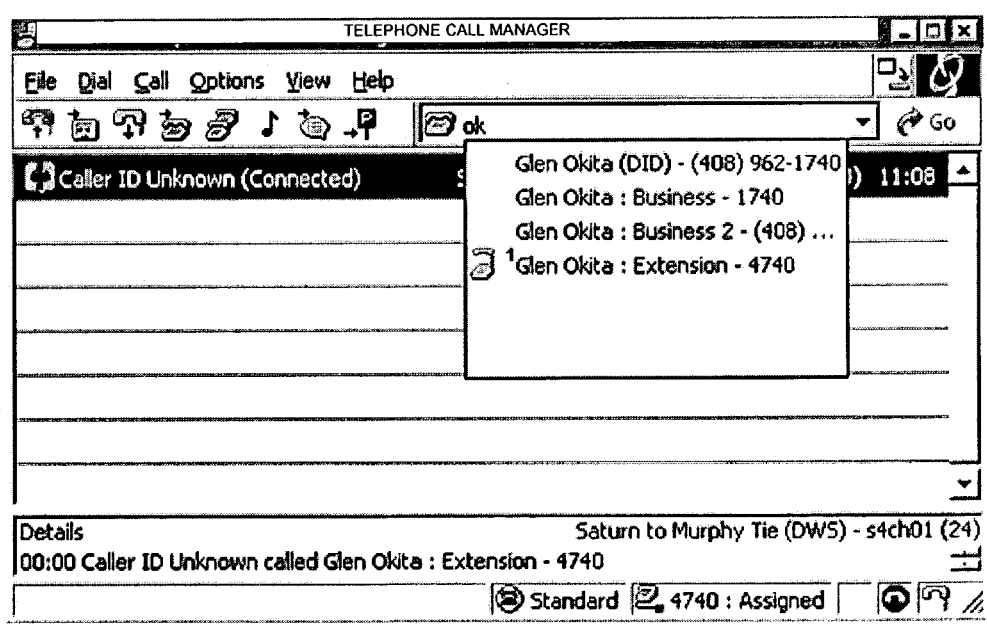

FIG. 4A illustrates a list of suggestions and real-time call status that is displayed when just the letter "o" is entered as user input. Note that the letter "o" may match either the first initial of either the first name or the last name. As the user types another character "k" thereby to form "ok" as the user input, the list of suggestions is re-drawn, as illustrated in FIG. 4B.

Figure 4C:
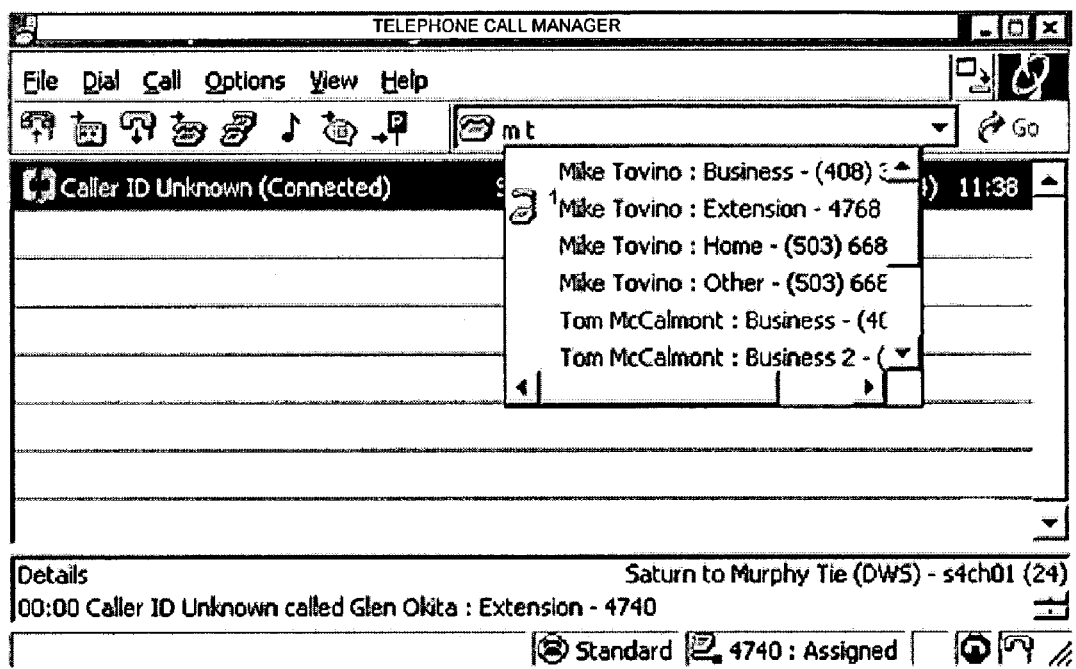
Figure 4D:
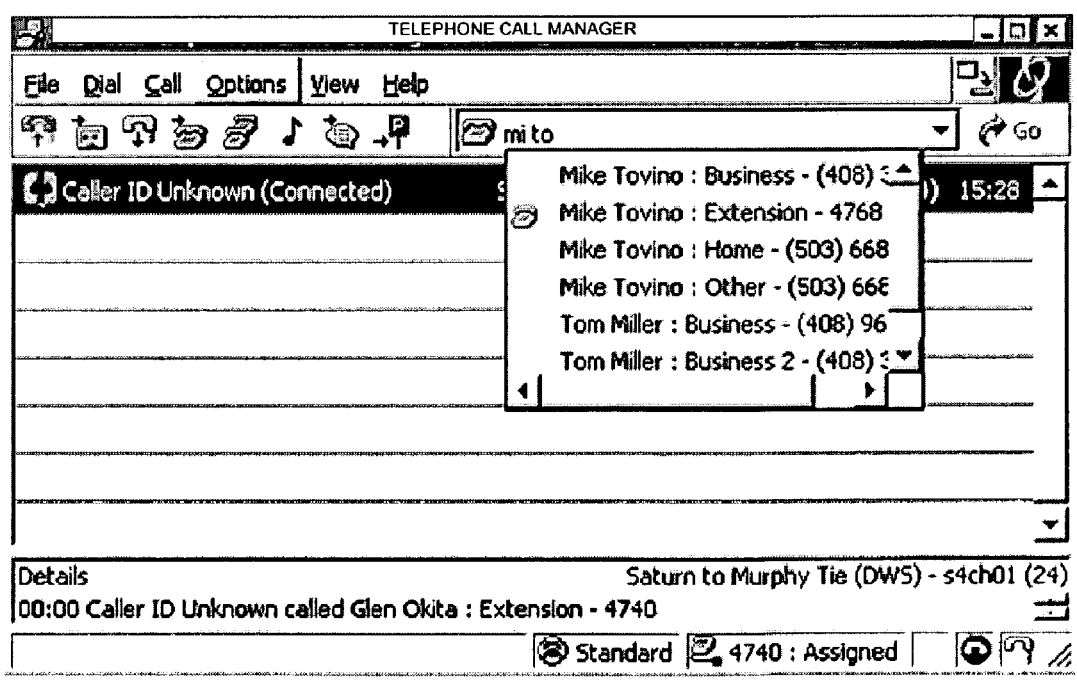

It is not necessary for the user input to be a string of characters, instead the user may supply the first initial of each of the first name and the last name with the two initials separated by a space, as illustrated by "m t" in FIG. 4C. Moreover, the user may provide the first two characters of each name, as illustrated by "mi to" in FIG. 4D.

Figure 4E:
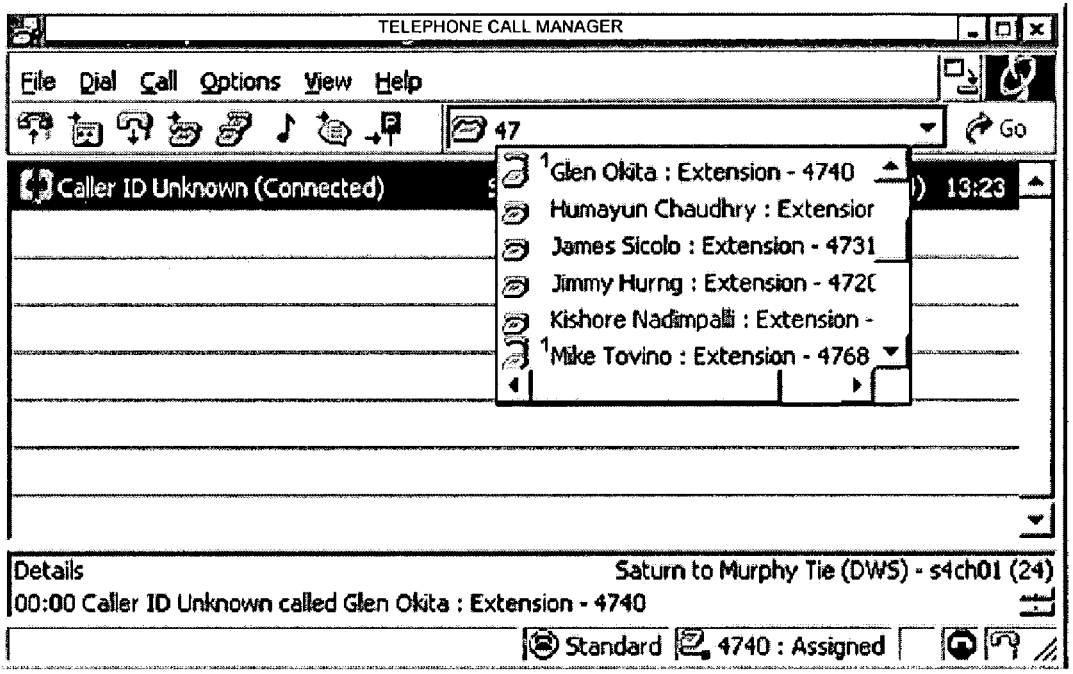

Furthermore, in the same dialer bar of the telephone call manager, the user may provide a fragment of a phone number as the user input. Specifically, as previously illustrated in FIG. 2B, the user may provide the number "5" as the first digit of either an area code, or an extension for example. In a manner similar to that discussed above for text strings, as the user provides more input the list of suggestions changes to more closely match the user's intended callee. Therefore, FIG. 4E illustrates a display of suggestions and the related real time call activity for all extensions starting with "47".

Figure 4F:
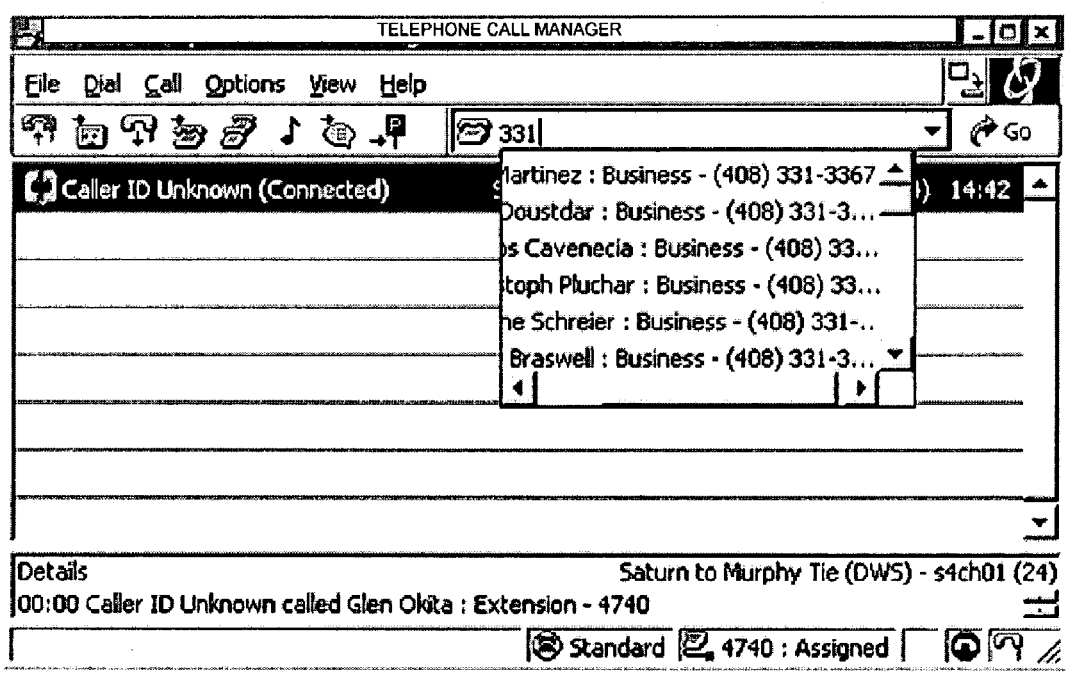

Note that if the user input matches an area code or a three digit switch number that follows the area code, no real time call activity will be displayed (unless a telephony switch external to the organization is configured to provide such information). Even so, the suggestions are displayed, as illustrated for the user input "331" in FIG. 4F.

Figure 4G:
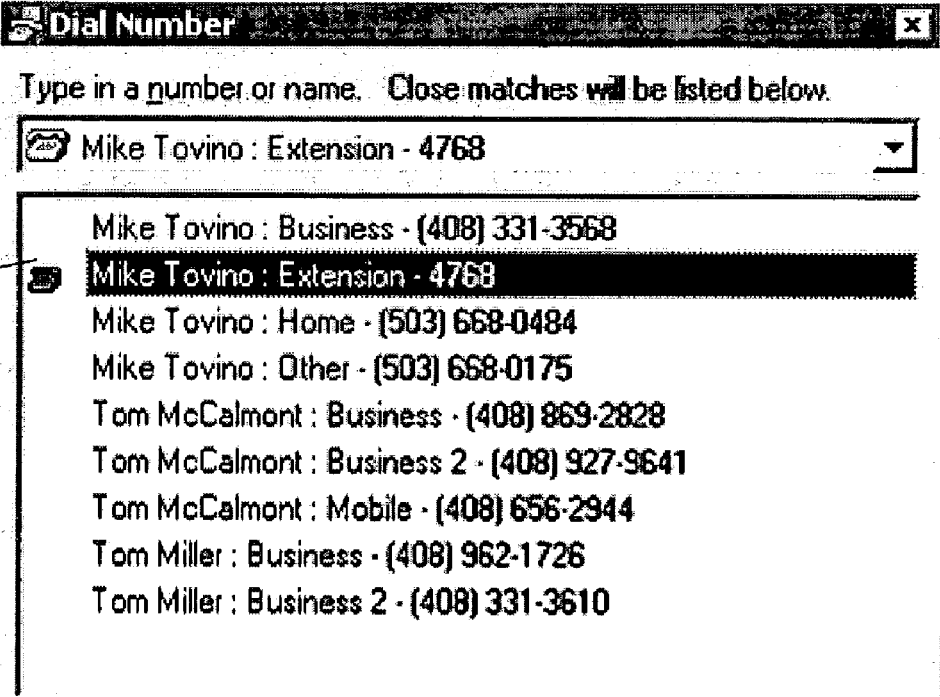
Figure 4H:
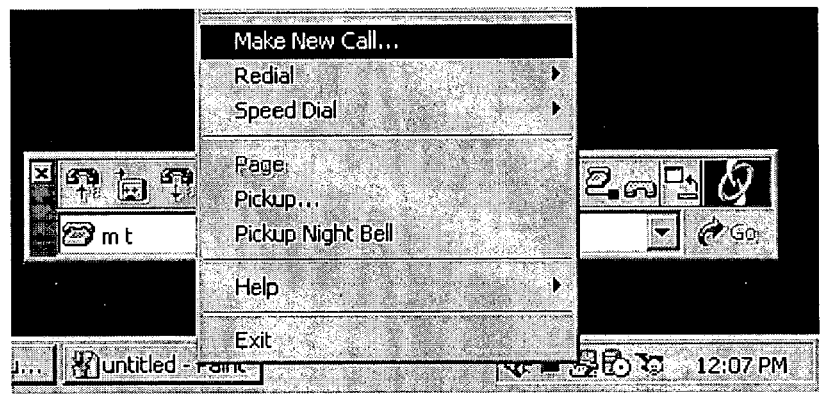
FIG. 4H illustrates, in a graphical user interface, other aspects of one embodiment of a telephone call manager, of the type illustrated in FIGS. 4A-4G, to permit a user to make a phone call, redial or speed dial or pick up a phone ringing at another extension.
Figure 4I:
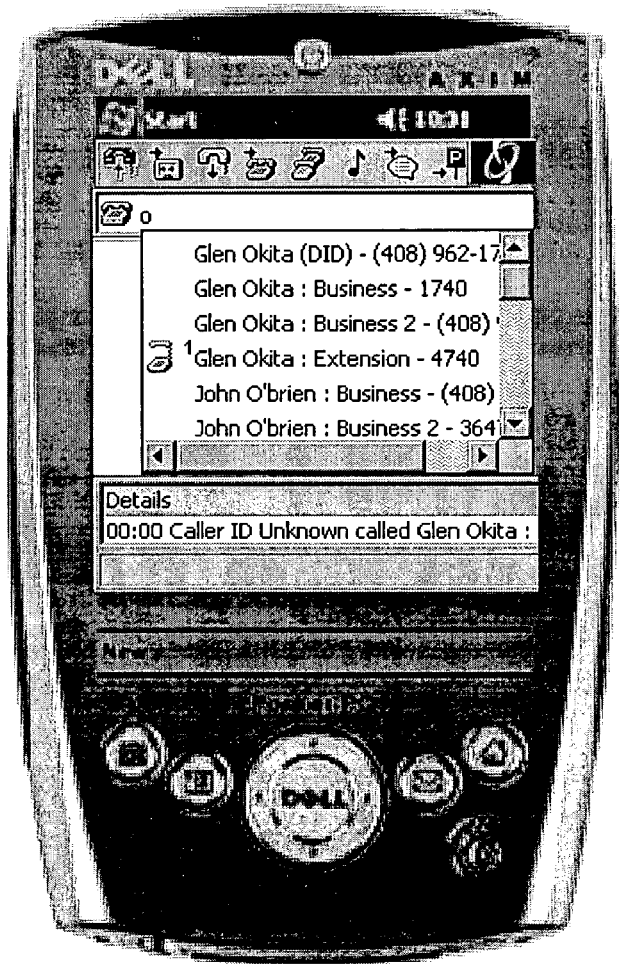
FIG. 4I illustrates, a graphical user interface of one embodiment implemented in a handheld device (such as a pocket PC).

In the process of making a selection, certain embodiments display extended information about a callee. Specifically, as illustrated by extended information in field 411 in FIG. 4G, detailed information about the callee Mike Tovino in row 410 in the suggestion list is displayed when that row is selected (either by a mouse click when pointing to the row to be selected or by simply moving the down arrow to reach the row to be selected). The extended information that is displayed may include, for example, (a) the callee's settings for forwarding to voice mail (e.g. after 3 rings and when line is busy), and (b) extension number of the voice mail server that services this callee.

Note that if a call is made to the callee then the extended information also includes the caller who is calling the callee, as illustrated by field 254 in FIG. 2C. Specifically, as illustrated therein, the caller Evil Empire is currently placed on hold by Doctor Evil (who's extended information is being displayed in field 254). Therefore, if a subordinate to both Doctor Evil and Evil Empire were the user who's in the process of calling Doctor Evil, then that user may use the extended information in field 254 decide to wait until after the two high-ranking employees finish their phone call. Such extended information is also useful when a user is deciding whether or not to transfer a call to the callee, e.g. if the callee is handling an important call from their own supervisor, the user may transfer the caller to voice mail.

In certain embodiments, presence information of the type described herein (e.g. call activity and/or user activity on an input device (e.g. keyboard/mouse) as displayed in an instant messenger) is displayed on a telephone equipped with a display (e.g. a liquid crystal display). The combination of automatic generation of suggestions and presence is useful when making new calls, and when performing transfers and consultation calls. This is illustrated in FIG. 11B showing an exemplary telephone's display. The display has a text area 1105, and the first line of the text area shows the user input 1104. User input may be performed by dialing digits, dial-by-name digits, or may be alphanumeric depending on the telephone device's capabilities.

In an example illustration, the user input "86" is used for dial-by-name to match all entries with an initial character of T, U, or V and a second character of M, N, or 0. In particular, this matches the combinations "TO", "UO", "VO", "TM", "TN", "UM", and "UN". The entries matching those combinations are shown in an autocompletion list 1106.

In the case of a text display on a telephone, iconic or graphical representations of call activity is replaced by text-based equivalents. In this example, the number of active calls at each potential callee is indicated by a parenthesized number. If there are no active calls, as for Tom Miller, then the area is left blank. An autocomplete list that is longer than available screen space is navigated using arrow keys 1108. With limited screen display, soft keys 1107 are used to select what numbers are shown.

Figure 5A:
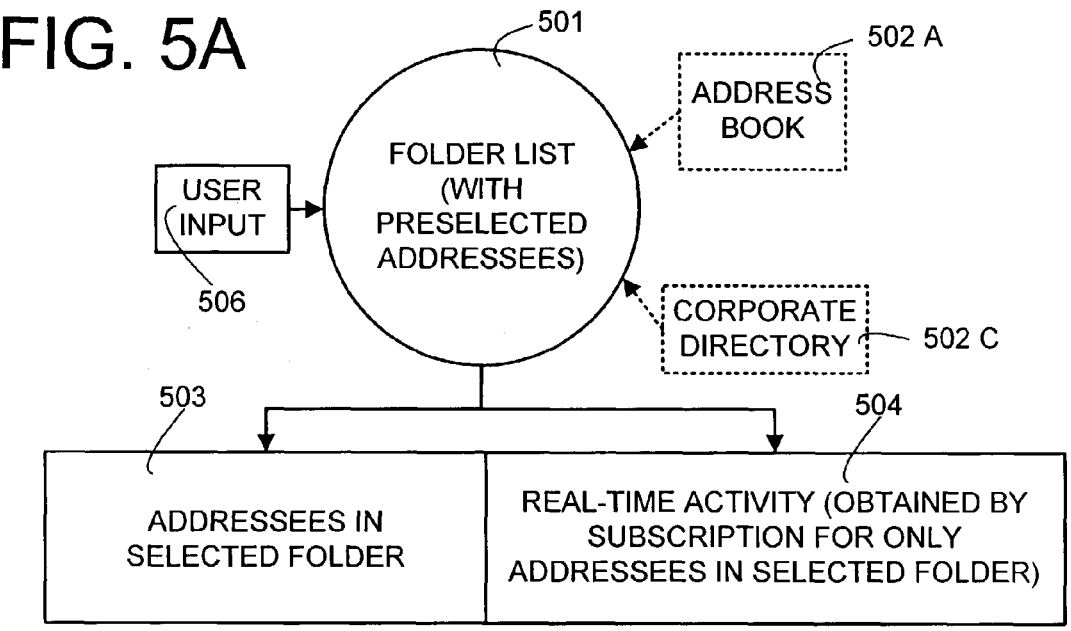
FIGS. 5A, 5B and 5C illustrate use of a folder list to obtain and display real time information on selected addressees (identified in a folder), in an instant messenger (IM) client in some embodiments of the invention.
Figure 5B:
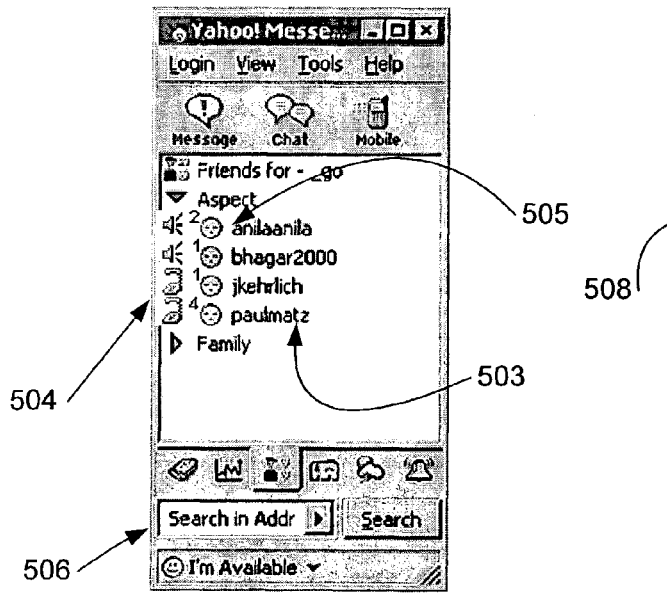
Figure 5C:
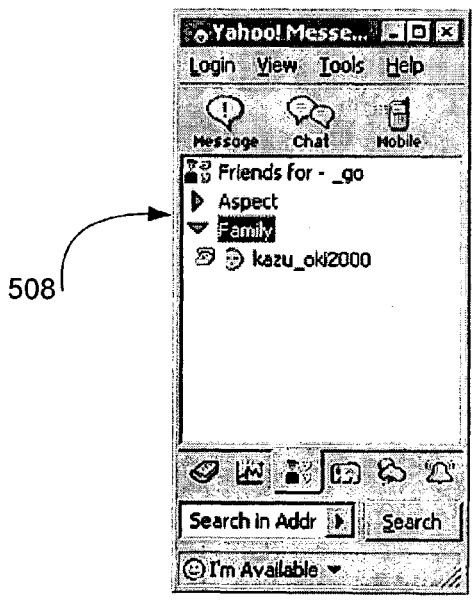

Although several exemplary embodiments have been described above in reference to a dialog box having an autocomplete feature, the user input can be obtained in any manner well known in the art for use with GUIs. For example, instead of the autocomplete dialog box, FIG. 5A illustrates use of a folder list
(with preselected addressees) of the type normally found in an email client and/or an IM client. In such a case, there is no automatically generated suggestion and instead the user simply navigates their folder list in the normal manner (by clicking on one or more folders to open subfolders and so on recursively until a list of potential addressees is displayed in the bottom-most folder). In such a case, the client displays not only the list of potential addressees in the selected folder, but also obtains real-time activity by subscription for only addressees in a selected folder. The real-time activity that is obtained after selection of the folder is thereafter displayed to the user, along with the list of potential addressees. The user selection of a folder controls which items are being identified to obtain real-time information. In FIG. 5B the folder "Aspect" is selected by the user and in this folder 4 items are present which are therefore displayed to the user along with presence information (which may be in the form of IM presence and/or telephone presence). In FIG. 5C the folder "Family" is selected with 1 item visible. In each case, the selection of a folder determines the list of possibilities for which real-time information is requested.

One embodiment of the folder-list based embodiment is illustrated in FIG. 5B in the context of an IM client, wherein the real-time call activity of all potential callees in a selected folder is displayed by icons 504. Depending on the embodiment, information for displaying icons 505 that indicate the IM status of the potential callee may be obtained and displayed in the normal manner of an IM client. Alternatively such information for displaying icons 505 may be obtained only after selection of a folder, thereby to limit the collection of information to only the information that is likely to be needed by the user when initiating a communication (either a phone call or an IM session). In current IM systems, IM presence is indicated by a set of states. These states may vary from system to system and may be extensible. The states supported by Microsoft Real Time Client are: RTCXS_PRESENCE_OFFLINE, RTCXS_PRESENCE_ONLINE, RTCXS_PRESENCE_AWAY, RTCXS_PRESENCE_IDLE, RTCXS_PRESENCE_BUSY, RTCXS_PRESENCE_BE_RIGHT_BACK, RTCXS_PRESENCE_ON_THE_PHONE, and RTCXS_PRESENCE_OUT_TO_LUNCH. IM presence state may be changed automatically or by user request. For example, current IM clients have the ability set presence to online or available when they detect keyboard or mouse activity on a desktop computer. Further, current clients may also set presence state to be away or unavailable when no activity is detected after an idle period. This period may be configurable and is typically between 5 and 15 minutes. More advanced IM clients may automatically set presence state when detecting network changes (e.g. undocking a computer or PDA), or when turning a device on or off (e.g. cell phone).

Note that in the embodiment illustrated in FIG. 5B, the user who's initiating a call is presented with two kinds of presence information (one kind from the telephony switch and another kind from an IM server), and the two kinds of information together provide a better indication of the availability of the potential callee than if either kind of information was presented by itself. Note however, that in certain embodiments, only one of these two kinds of information may be presented to a user who's initiating a communication.

There are implementations of IM servers and clients that display presence information that are offered by Microsoft Corporation and Jabber, Inc.
http://msdn.microsoft.com/library/default.asp?url=/library/en-us/dnwxp/html/rtc_api_final.asp
http://msdn.microsoft.com/library/default.asp?url=/library/en-us/rtcclnt/rtc/rtc_overview.asp
http://www.jabber.com/products.php
These products implement presence information using protocols based on RFC2778 and draft-ietf-impp-cpim-02.txt which is incorporated by reference herein in its entirety.

Figure 6A:
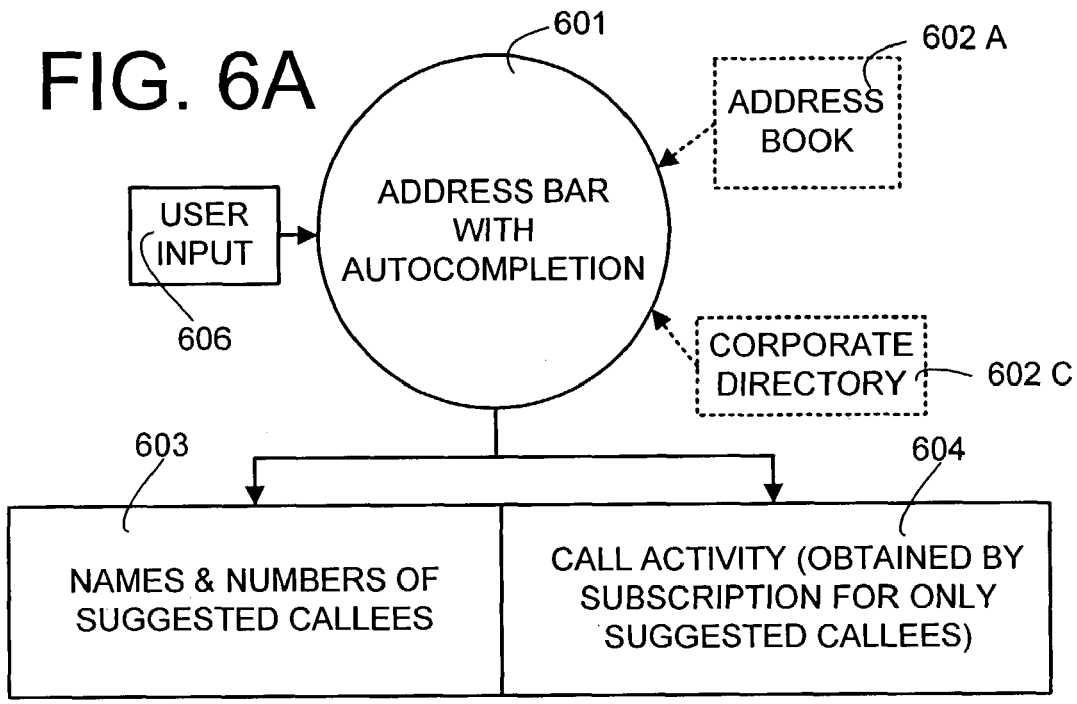
FIGS. 6A and 6B illustrate use of an address bar with autocompletion in an IM client to display presence obtained by subscription for only suggested callees, in some embodiments of the invention.
Figure 6B:
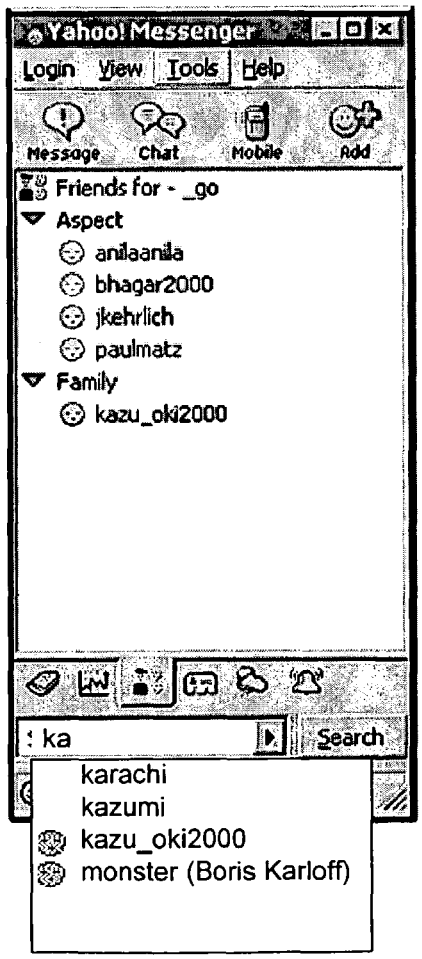
Figure 7A:
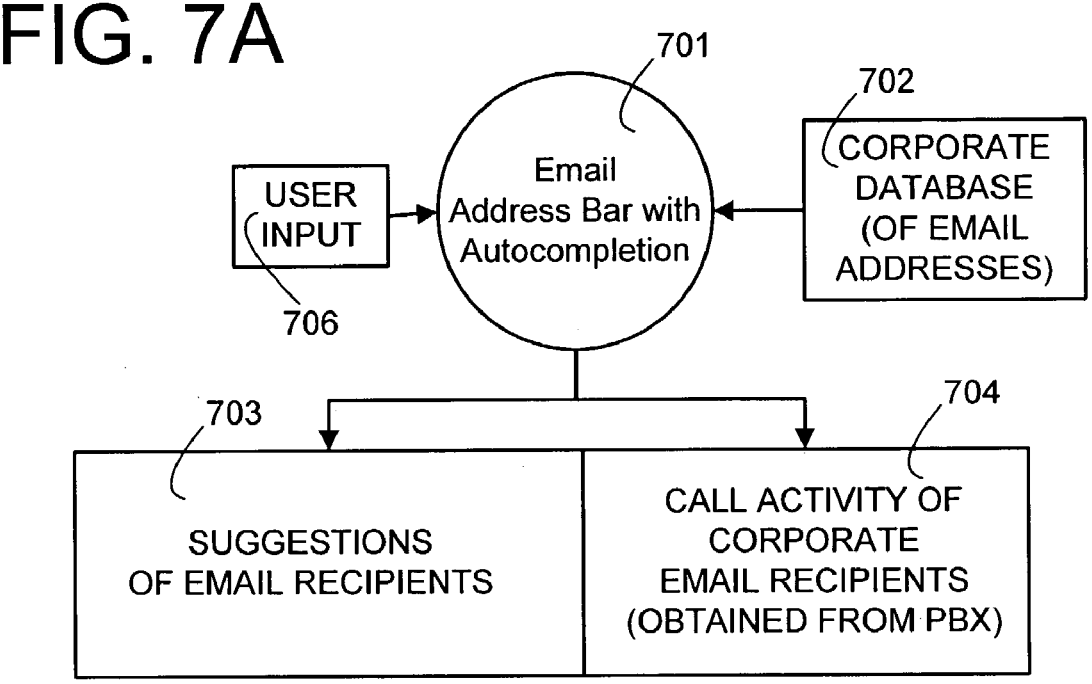
FIGS. 7A and 7B illustrate use of an address bar with autocompletion in an email client to display call activity obtained by subscription for only suggested email recipients, in some embodiments of the invention.
Figure 7B:
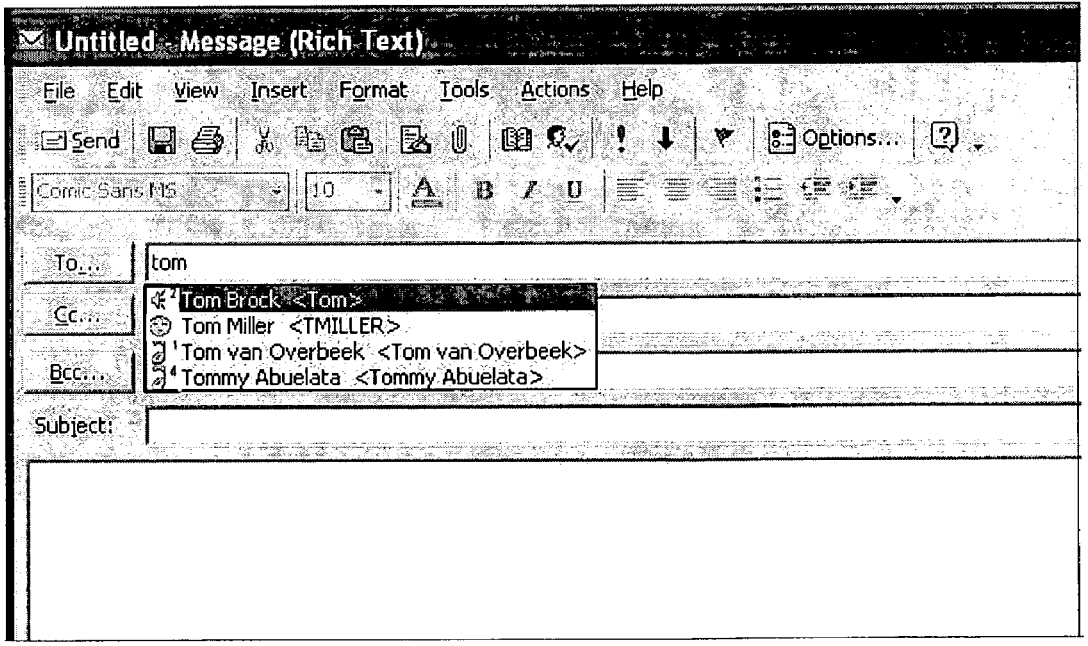

In yet another embodiment, an address bar 601 in an IM client is equipped with autocomplete feature and call state display as illustrated in FIGS. 6A and 6B. Address bar 601 is designed to function in the manner discussed above, for example see address bars 201 and 212 in FIGS. 2A and 2B respectively which have been described above. Moreover, a similar or identical address bar can be implemented with an email client as illustrated in FIGS. 7A and 7B.

Figure 8A:
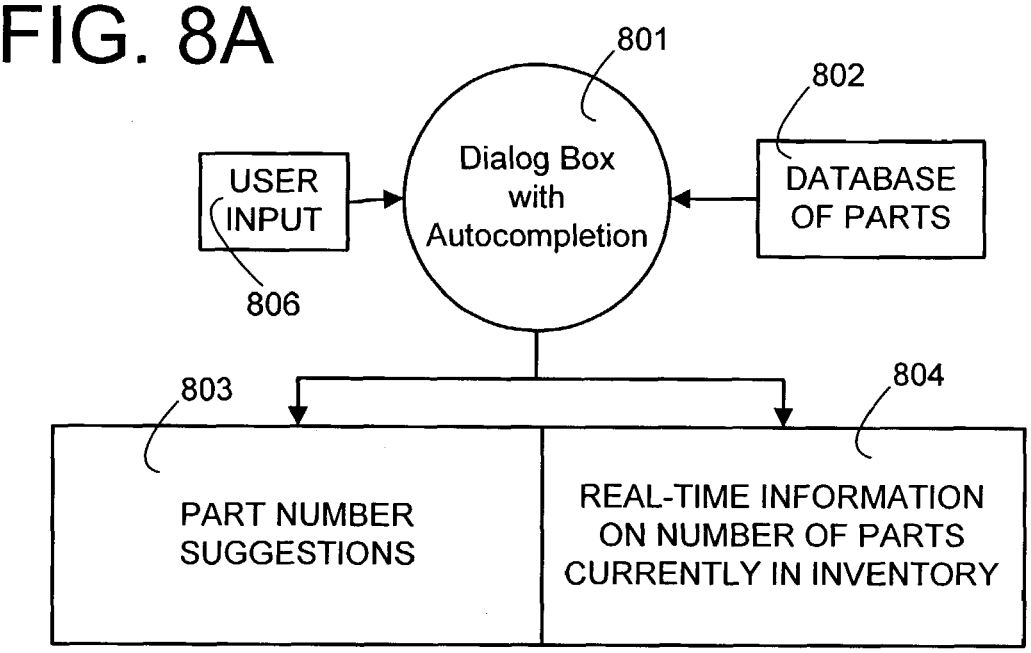
FIGS. 8A and 8B illustrate use of a dialog box with autocompletion in a supply chain software, to display an inventory of parts that are listed as suggestions in a form for ordering parts, in some embodiments of the invention.
Figure 8B:
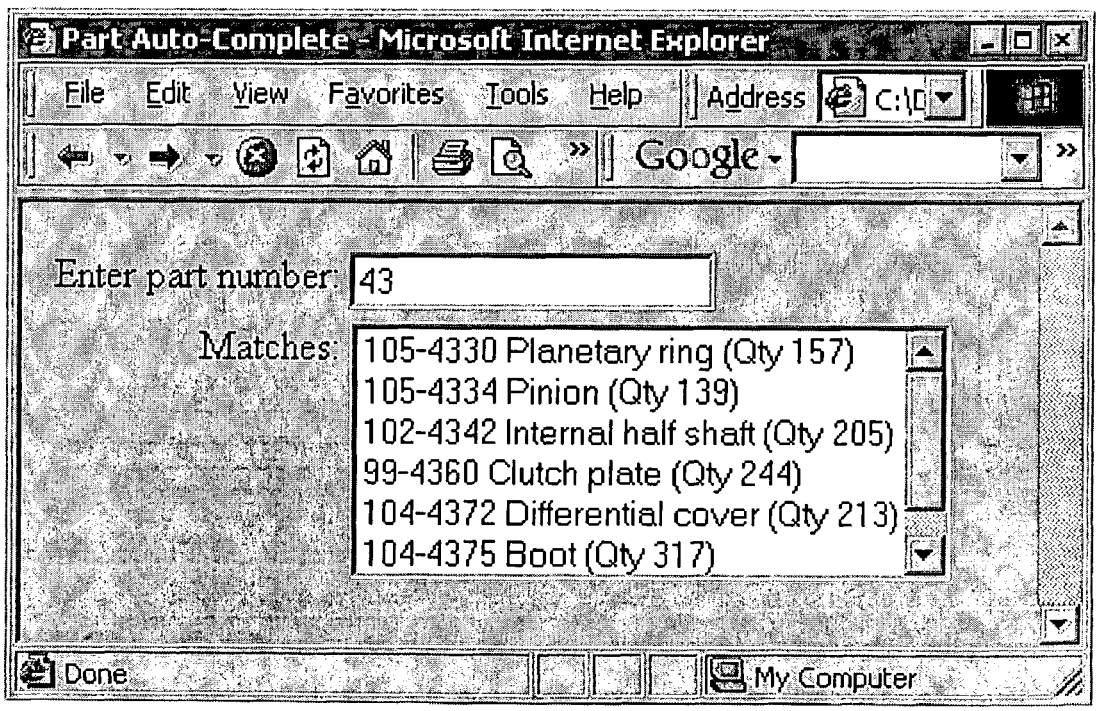

Furthermore, although the above description refers to display of real time information about people, other embodiments display other kinds of real time information when displaying suggestions that are generated automatically in response to a user's input. For example, a user may input a part number in a form for ordering an additional supply of a part. And in this process the user may be informed of the amount of supply of several parts that are being automatically suggested. See FIGS. 8A and 8B for an illustration of this embodiment.

Figure 9A:
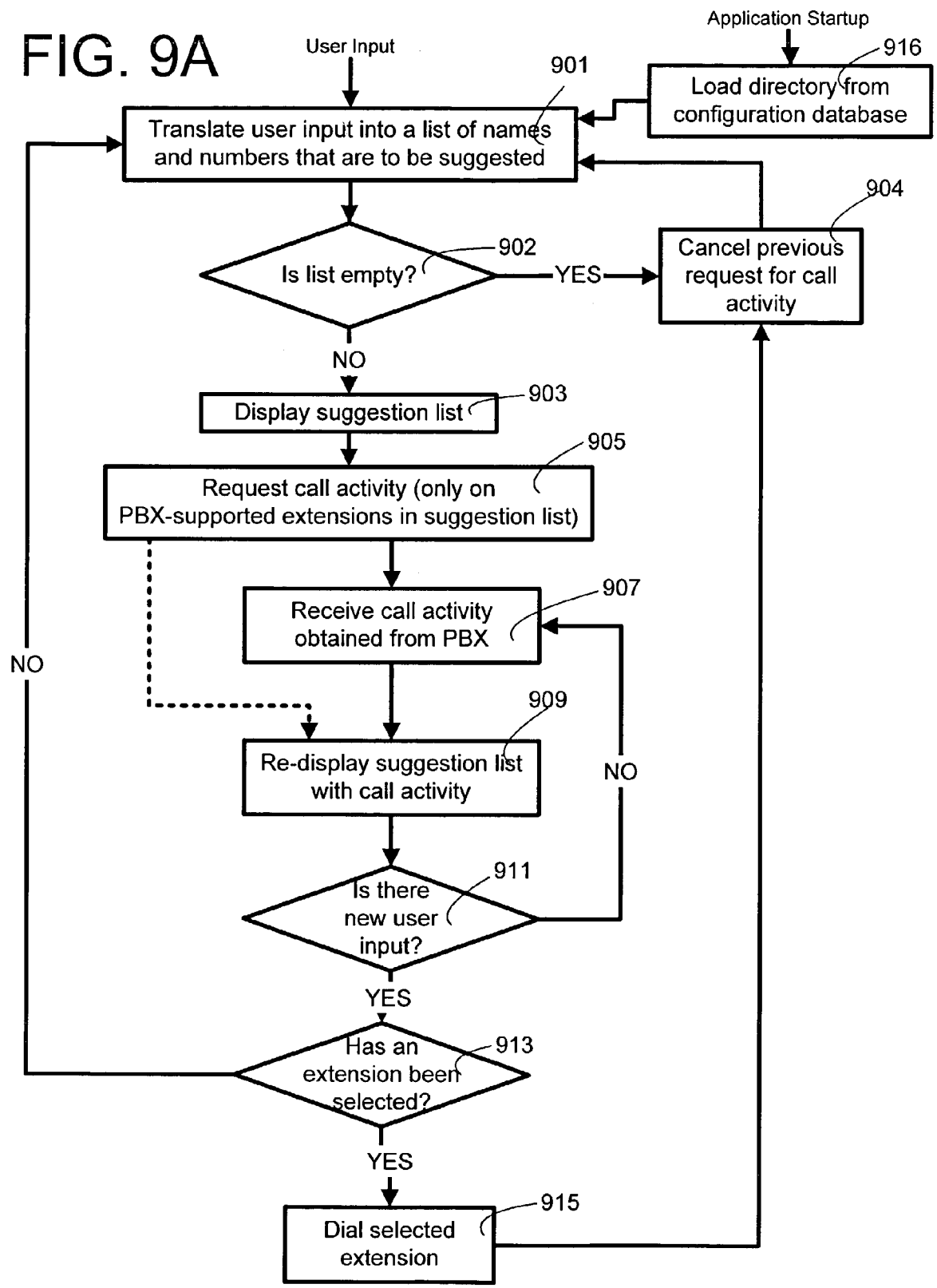
Figure 10A:
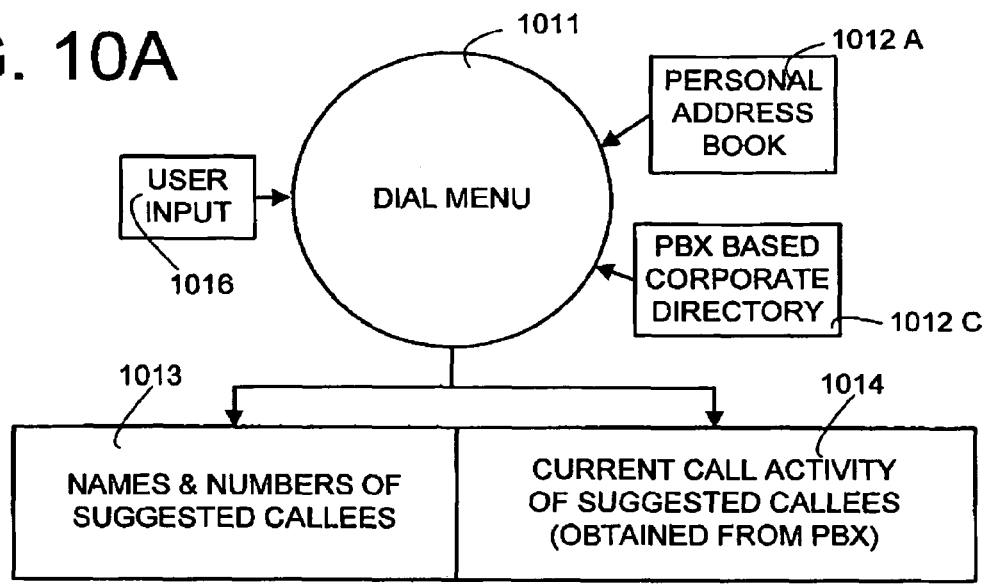
FIG. 10A illustrates, in a block diagram, one specific architecture including a microcontroller in a telephone that is programmed in some embodiments of the invention to display call activity presence.
Figure 10B:
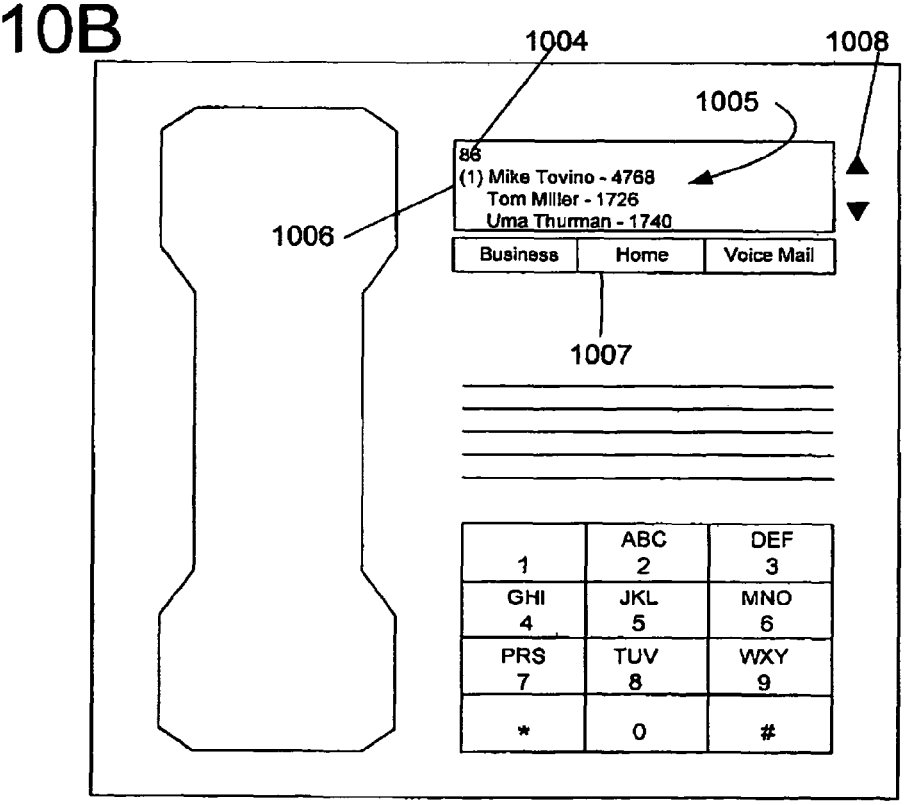
FIG. 10B illustrates a telephone of the type used in the embodiment of FIG. 10A.

In one illustrative embodiment, a computer on a user's desk is programmed with telephone call manager software to perform the method of FIG. 9A, to implement a display of real time information with a display of suggestions that are automatically generated in response to user input. Specifically, in an act 901, the telephone call manager translates user input that is received via an edit control, into a list of names and numbers that are to be suggested to the user. Depending on the embodiment, such user input may be obtained from any control implemented by any feature in a telephony application, such as Dialer, Transfer, Conference, Pickup, Unpark, and Park. Therefore, such a control shows the user whether or not a target extension is busy but only at such times as this information is needed—namely when the user wishes to involve said extension on a call.

Therefore, as the user types one or more characters into the edit control, the telephone call manager uses a previously-stored mapping which indexes known extensions and contacts by name and phone number, to identify the suggestions. The identified suggestions (up to a predetermined maximum number) for the text typed into the edit control are shown to the user in a pop up window, as per act 903. Typing of subsequent characters into the edit control further filters the list, until eventually there is only one suggestion (or none, if the characters you type in do not match anything in the memory store).

In performing act 901, entries in the memory store can be matched by name or number. When matching by numbers, extensions, subscriber numbers in local area code, area codes in local country code, and country codes are matched. When going by name, any single word in a name is matched during act 901. If a user types in more than one token separated by spaces, names with all of then tokens are matched. As discussed above, typing "J B" suggests John Brown and Brian Jones; as would "Jo Br". "Bri J" only suggests Brian Jones though.

Also as noted above, suggestions from act 901 are shown in a pop-up window that is displayed (as per act 903) below the edit control. Note that act 901 may be performed in any manner well known in the art, as described in, for example, U.S. Pat. No. 5,923,848. More details of another embodiment are discussed below.

If act 901 results in an empty suggestion list, then any previous request to obtain call activity is canceled. The suggestion list may be empty because user input has been cleared, or because the user has over-constrained the input such that there are no matches. If the list is non-empty, then act 903 displays the autocompletion suggestion list.

Next, in act 905, the telephone call manager generates a request for call activity associated with potential callees who are identified in the suggestion list. The request that is generated depends on the specific architecture of the computer in which the telephone call manager is implemented. For example, the telephone call manager may simply send a message or an event to software in the programmed computer that in turn interfaces with the outside devices (devices which are outside the programmed computer) and does whatever is necessary to obtain call activity for extensions of the suggested callees.

In the case where real-time information is available for external telephone numbers, then telephony presence in the form of call activity information is also requested from the external provider by act 905.

At some point thereafter, the telephone call manager receives the call activity that was requested (as per act 907, and re-displays the suggestion list but now with the call activity that was received (as per act 909), and then goes to act 911. Note that to avoid a delay caused by waiting for receipt of the real time information in act 907, the telephone call manager may directly go from act 905 to act 911 (as illustrated by the dashed line).

In act 911, the telephone call manager checks if there is new user input, and if so whether an extension has been selected (as per act 913), and if a new extension is selected goes to act 915 and dials the selected extension. After the user action is performed, the previous request for call activity is cancelled. If in act 911 the answer was no, then the telephone call manager returns to act 907 when there is subsequent call activity (discussed above). If in act 913 the answer is no, the telephone call manager returns to act 901 (also discussed above).

In some embodiments, the method of FIG. 9 is implemented as described below, using Microsoft's Telephony Application Programming Interface (TAPI). A reference guide of all TAPI functions, messages, structures is found on Microsoft's web site at http://msdn.microsoft.com/library/. One can locate the TAPI reference guide by searching for Telephony Application Programming Interface or just "TAPI" in the search bar at Microsoft's web site.

For more information on TAPI, see a book entitled "MAPI, SAPI, and TAPI Developer's Guide" by Michael Amundsen, published by Macmillan Computer Publishing, ISBN: 0672309289 and another book entitled "Windows Telephony Programming; A Developers Guide to TAPI" by Chris Sells, published by Addison Wesley, ISBN: 0201634503.

In another illustrative embodiment, a computer on a user's desk is programmed with an instant messaging application that performs the method of FIG. 9B, to implement a display of real time information with a display of suggestions that are automatically generated in response to user input. In FIG. 9B, many of the acts that are performed by the instant messaging application are similar or identical to acts performed by the telephone call manager described above in reference to FIG. 9A. For this reason, the same reference numerals are used in FIG. 9B for acts that are similar or identical to the corresponding acts in FIG. 9A.

The act of generating a directory 916 is optional. In corporate or enterprise environments, such a directory is an efficient way to navigate the set of all employees. This set of all employees may be partitioned by site or department or both, and the directory may initialized with a subset of employees.

Figure 1A:
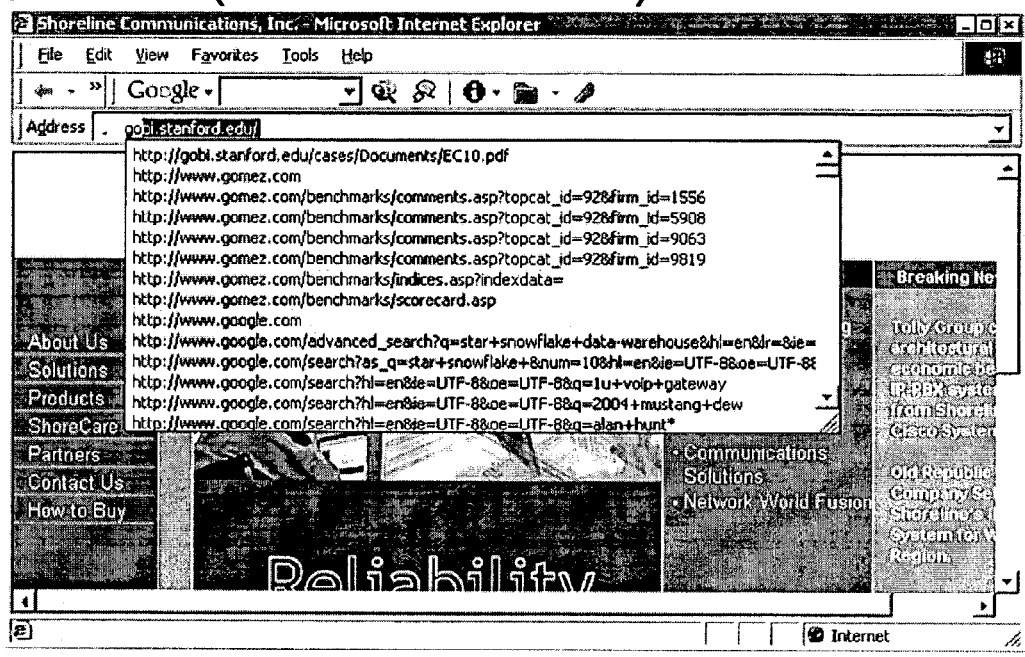
FIGS. 1A-1G illustrate graphical user interfaces (GUIs) of the prior art.
Figure 1B:
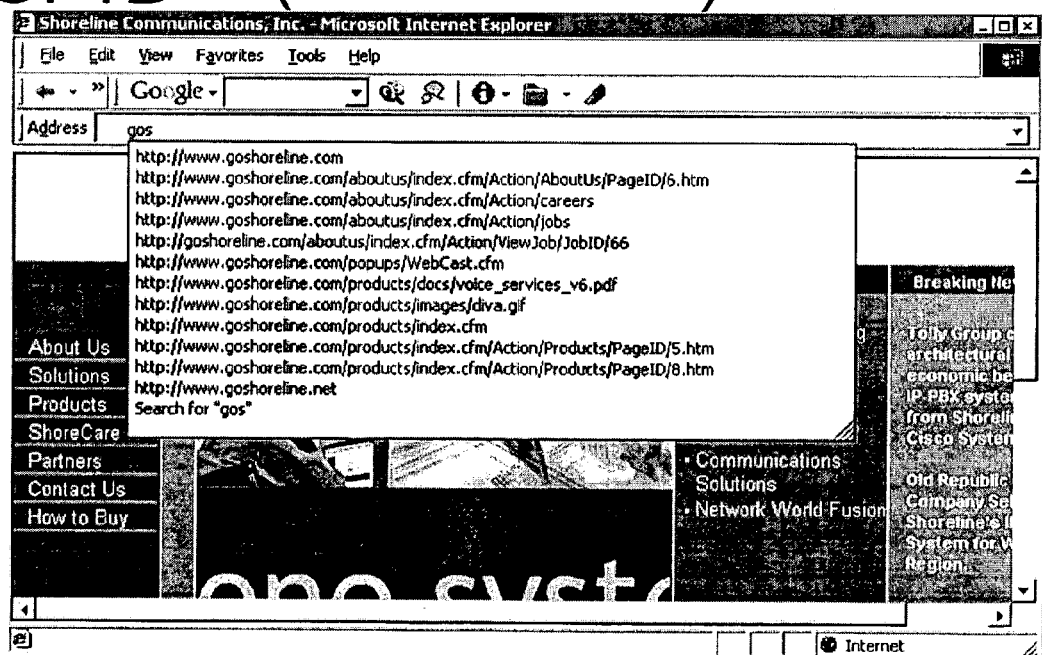
Figure 1C:
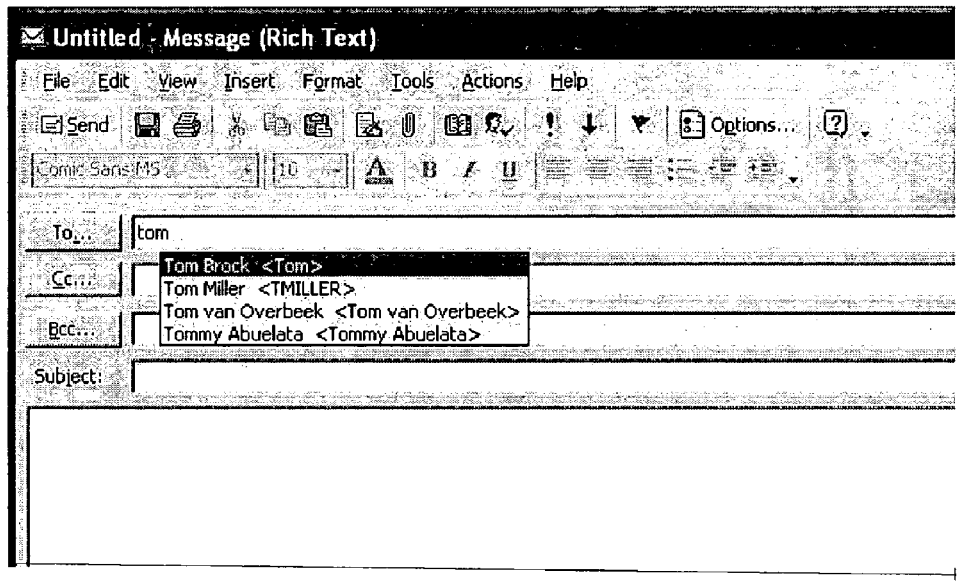
Figure 1D:
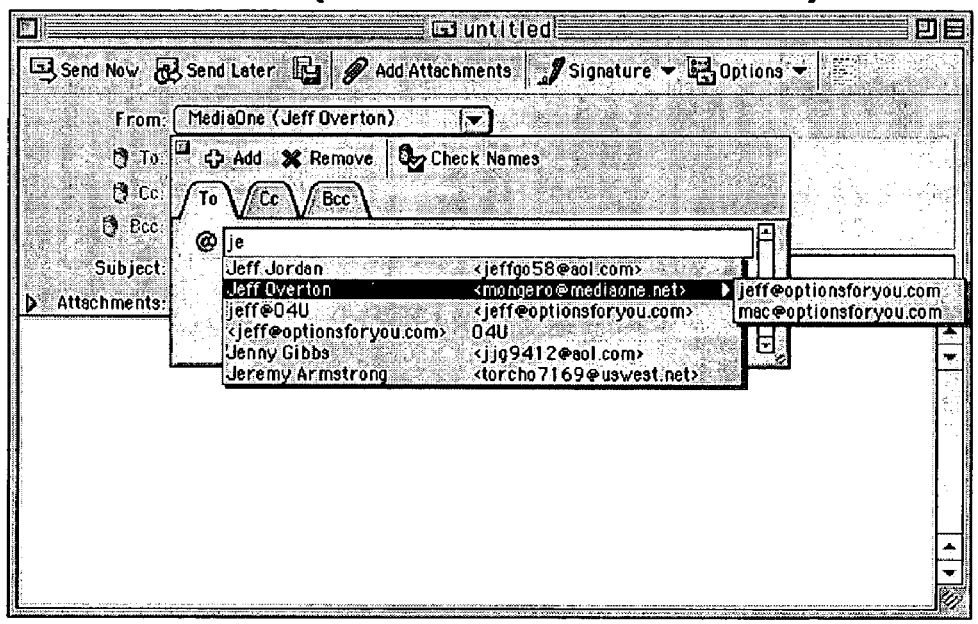
Figure 1E:
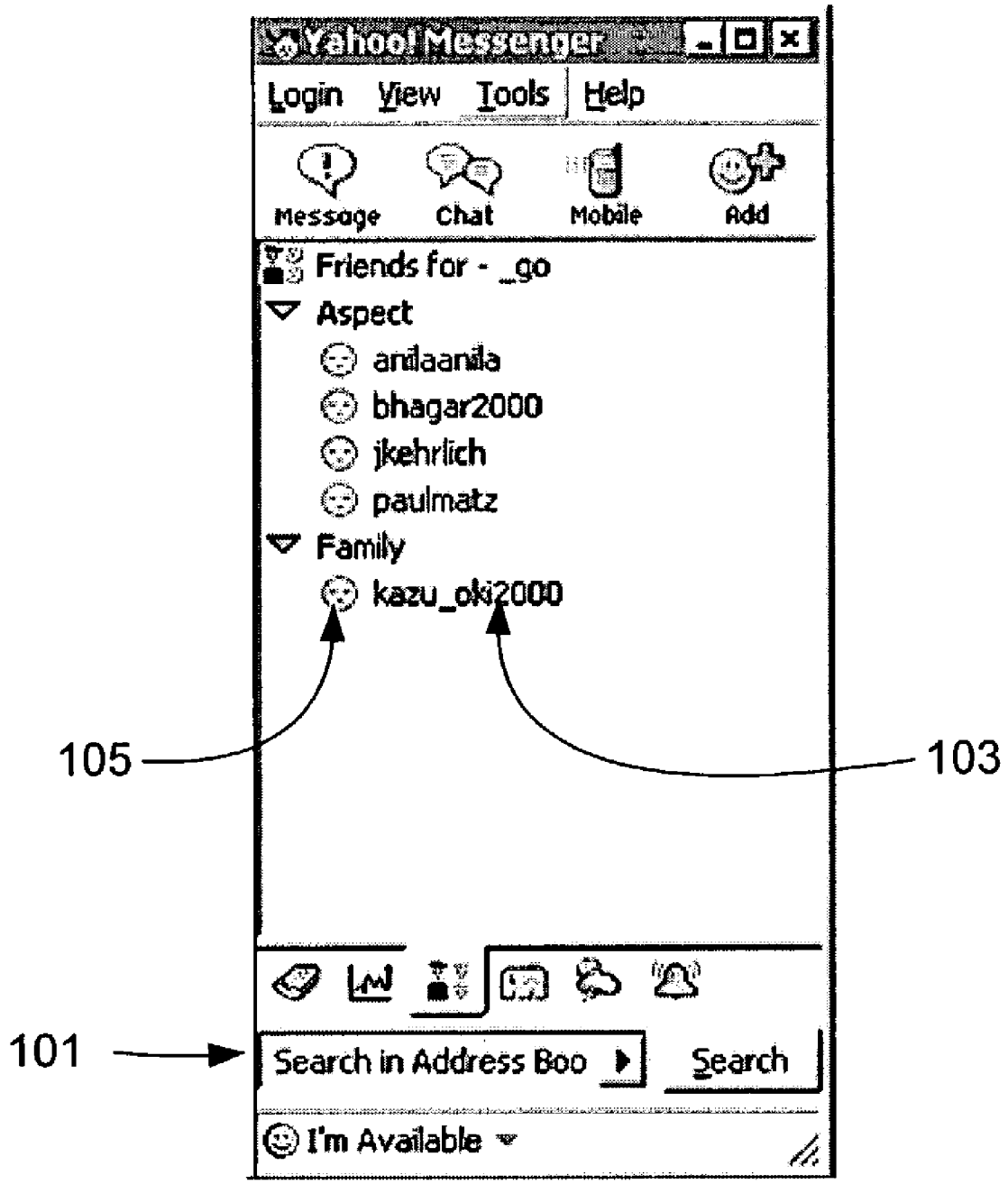
Figure 1F:
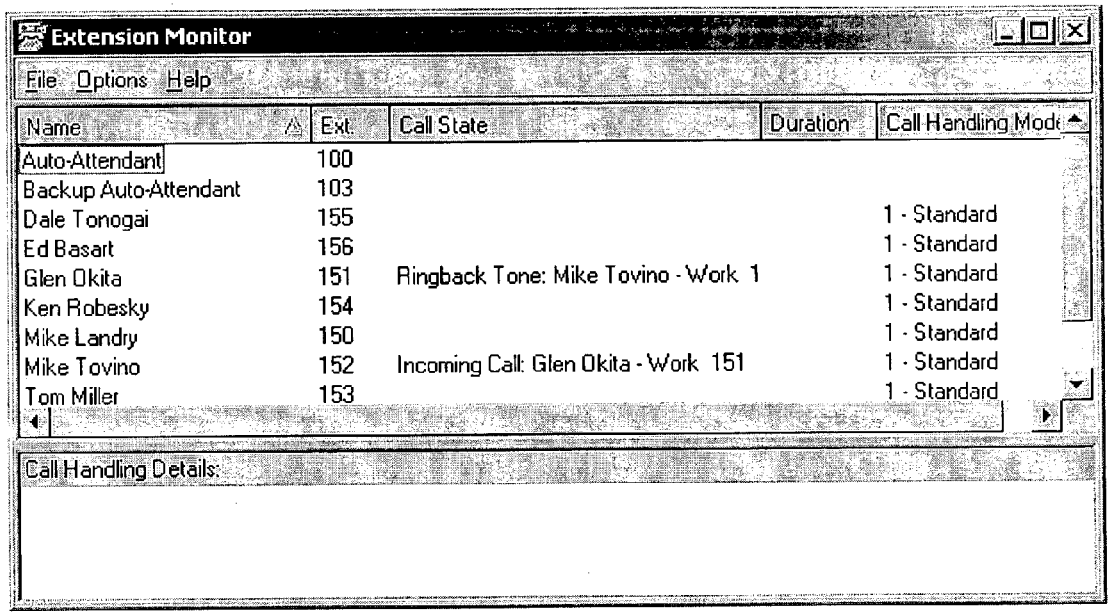
Figure 1G:
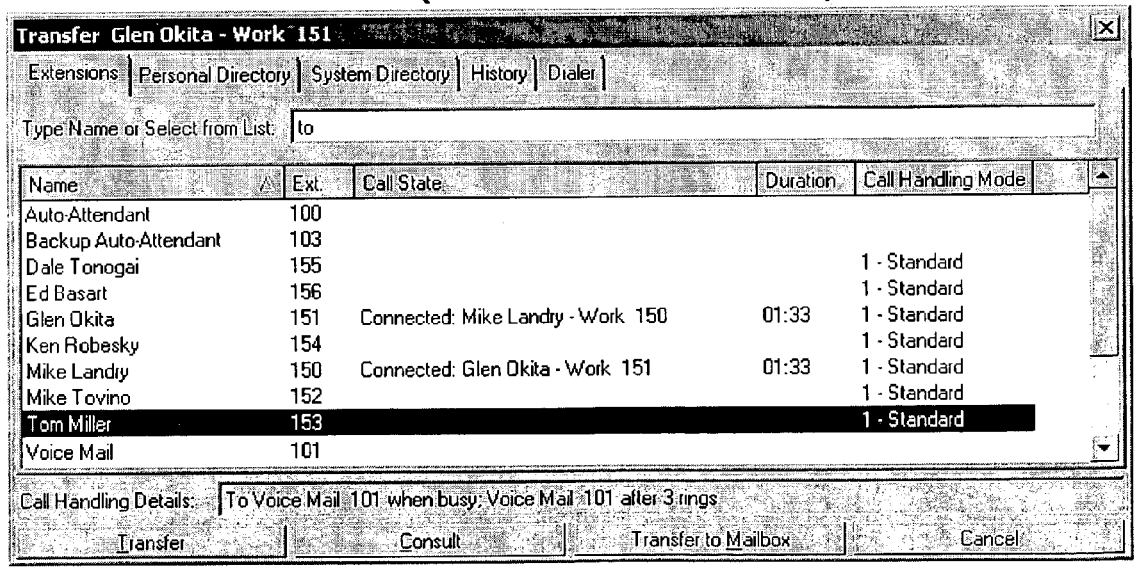

In the public Internet environment, it may be difficult to identify all possible entries in a directory. In this case, an autocompletion suggestion list may be generated by using a history of previously entered items, e.g. as illustrated in FIGS. 1A and 1B. It may be generated from local configuration, such as the IM buddy list. A combination of data sources is used in several embodiments, to create a set of all possibilities (e.g. set 202 discussed above).

User input 901 may be supplied in the form of partial input may generate an autocompletion list. Alternately, user input may be supplied as a folder selection or any other input that indicates the user's current intent to operate on a subset of all possibilities.

Next, act 925 uses the selected possibilities to request real-time presence subscriptions. This act 925 is analogous to act 905 for the telephony example. However, an IM client manages its own list of subscriptions. The list of possibilities generated by the most recent user input is compared to previous lists from earlier input. If there are current subscriptions that are not in the possibilities list, they may be canceled. A subscription should only be canceled, however, if it is used solely by the just-in-time method. An existing subscription for an item that appears in a client's buddy list is not removed. If there are new possibilities in the list, then new subscription requests are made if needed. If the new possibilities on the list correspond to previous subscription requests that have not been completed, then no additional subscription request is made. Sample code for making a subscription request and registering for subsequent notifications is contained in Appendix R.

However, a traditional IM request for presence has no guarantees of timeliness or success. Alternative embodiments perform management of subscriptions to keep them active in case they are needed in the near future.

Furthermore, in current IM systems a subscription request results in a confirmation dialog for the target addressee. A target addressee may traditionally decline to be subscribed to, resulting in no presence information being available. When current IM systems are used with frequent re-subscription requests, the target addressee may be annoyed as well.

Therefore, in some embodiments, the subscription manager 925 limits the frequency with which new subscriptions are requested, such as once a day. For corporate use of presence, certain embodiments offer a policy that defeats prompting of a target addressee to approve presence subscriptions. The policy may be implemented, for example, by an IM client which automatically accepts subscription requests. The subscription request for just-in-time real-time information gathering may be identified as such.

Specifically, identifying a just-in-time request is done in some embodiments of the invention by indicating it when the call is made, such as using an additional parameter. Using the Microsoft RTC API, this may be done as follows:
hr=m_pPresence->AddBuddy(bstrBuddyURI,
   bstrBuddyName,
   bstrBuddyData,
   VARIANT_TRUE,
   NULL,
   0,
   &m_pBuddy,
   RTCSUB_JUST_IN_TIME);
wherein the last parameter indicates a just-in-time subscription request.

Use of such an additional parameter or other such indication of the just-in-time nature of the subscription permits different policies to be followed for automatically accepting or denying subscriptions from a client of the present invention as opposed to conventional IM clients. Depending on the embodiment, such corporate IM clients may use a corporate directory 916, to specifically identify the corporate possibilities wherein repeated subscription requests are acceptable. Finally, presence information may be unavailable if the device or computer supplying the information happens to be turned off or otherwise unreachable on the network, or the user may have elected to accept subscriptions but not publish any status. In certain embodiments, the display of information performed in act 903 conveys to the user one or more of the following: the quality, timeliness, and availability of real-time presence status.

The illustration of FIG. 5B shows real-time information for both presence and call activity. For such an implementation, act 925 obtains call information as indicated in 905 and 907 of FIG. 9A. Once call activity is obtained, it can be mapped to a displayed possibility. To display both call activity and presence together, it is necessary to determine the correspondence of real-time activity for a phone number with the real-time presence status.

The mapping may be specified explicitly by the user (e.g. a local address book entry with both a PBX extension and an IM buddy name), it may be specified explicitly in a corporate directory (e.g. employee "Glen Okita" has extension 1740 and an IM address of gokita@shoretel.com), or it may be performed automatically using a common data item in the both the PBX directory and an IM buddy list. The common data item may be the name of the person, the IM buddy name, the IM address, or an email address. Depending on the client, the selected possibilities displaying both call activity and presence may be a phone number entries or IM buddies.

When displaying both IM presence and call activity, there may be more than one status available for a selected possibility. For example, a single IM buddy or callee (e.g. callee 345 in FIGS. 3B-1) may have several phone numbers (e.g. numbers 342A-342C), and call activity may be available for some subset of these phone numbers (e.g. number 342B). In this case, a summary icon (e.g. icon 341) may be used that reflects the combined, or maximal, call activity across all phone numbers of an individual.

Depending on the embodiment, note that both kinds of presence information may be obtained for each name being automatically suggested, and a combined presence icon (e.g. an asterisk) for all available presence information of each name is displayed in a first screen 343 (FIGS. 3B-1). In such an embodiment, only after the user selects one of the suggested names (e.g. callee 341), a second screen 344 is displayed. Also, the combined icon 341 is the same, regardless of the type of presence information that may be available in second screen 344.

Furthermore, in an alternative embodiment, a combined presence icon is not displayed in a first screen 343, at least because no presence information is obtained when displaying the automatically generated suggestions. Instead, in this embodiment, the user is required to select one of the suggested names and on doing so only the user-selected individual's presence information is obtained and displayed in a second screen 344. Note that both kinds of presence information may be obtained and displayed (if available), as illustrated by call activity 340A and IM presence 340B.

A similar case may occur where a single phone number possibility may have more than one IM buddy, such as presence status for different IM service providers. The same principle can be applied to summarize available real-time information. A nested presentation of real-time information illustrated in FIGS. 3B-2 is an alternative that displays all information without requiring summarization.

Some current IM implementations allow either a persistent subscription or a one-time request for presence information. The presence information is returned as a notification. If a persistent subscription is established, then notifications continue to be received until the subscription is cancelled. The management of subscriptions in 925 can be simplified by only using one-time requests for presence information. This eliminates the need to remove subscriptions, and to check whether it is safe to remove a subscription that may appear in an existing buddy list. However, doing so reduces the capability of the client as subsequent presence changes will not be sent to the client. One example where a persistent subscription is useful is an IM "camp-on" facility where the user is notified when the state of an individual buddy becomes "available".

Unlike a PBX extension list, the need to distinguish between items that are known to have real time information available may not be necessary in some embodiments. For example, an IM client (when programmed as described herein) can simply request real-time status for all entries in the list. Some requests may succeed and some may not. To limit subscription activity, the displayed list of possibilities may be limited to a maximum size. A maximum of 20 to 50 entries has proven to be a workable autocomplete suggestion list.

The possibilities list is displayed in the GUI by act 903. The display may include recent real-time status that was cached from an existing or previous subscription request. If shown, this status should be displayed in a way that the user is informed that the display contains provisional or possibly obsolete real time status.

In some existing IM systems, requesting a subscription requires that an entry be added to a personal buddy list. A just-in-time subscription of the type described herein is transient and showing it briefly adversely affects usability. Instead, certain embodiments of these systems are modified to offer a subscription that is made in a just-in-time manner (i.e. after user input is processed to identify buddies that are likely to be at the other end of an IM session). Such a just-in-time subscription does not appear on any visible list.

As an alternative, some existing IM systems offer more than one buddy list, and such systems may be used as follows: a transient just-in-time subscription may be established by an IM client that is programmed as described herein to use a dedicated list for that purpose. This list may be kept hidden or collapsed to prevent user distraction.

Due to poor response of an IM presence subscription, notifications may be received by certain embodiments for a suggestion that is no longer displayed in an autocomplete list. For this reason, the IM clients are programmed in accordance with the invention to discard notifications for no-longer displayed suggestions. Another embodiment caches the notifications so they may be displayed as provisional presence if the same item is re-displayed in an autocomplete suggestion list in the near future.

In any case, when an action to communicate with a buddy is performed as per act 915, the subscription manager updates the subscription lists. This update is equivalent to when an empty possibilities list is generated by act 901.

In another illustrative embodiment, a telephone having a display (e.g. LCD) therein is programmed with a dialing and call control method of FIG. 9C, to implement a display of real time information with a display of suggestions that are automatically generated in response to user input. In FIG. 9C also, many of the acts that are performed by the telephone are similar or identical to acts performed by the computer of FIGS. 9A and 9B. For this reason, the same reference numerals are used in FIG. 9C for acts that are similar or identical to the corresponding acts in FIGS. 9A and 9B.

The display phone controller has access to all call activity in the system. It does not need to subscribe to activity, but merely maintains an event processing thread 907 to receive updates of call state from the PBX.

When call activity updates a received, they are merged with corporate directory information supplied by act 916.

Autocompletion for a telephone can be done by matching extension number, dial-by-name, or alphanumeric match. Alphanumeric matching is only available if the phone device has a full keyboard. Dial-by-name matching is performed by matching the letters A, B, C to number 1, then D, E, F to number 2, corresponding to the letter designations on a telephone keypad. Matching may be performed on both first and last names, on last name then first, or vice-versa.

The autocompletion suggestion list generated by act 901 can be displayed in act 903 by matching each entry in the suggestion list with the corresponding directory entry from act 916. The directory entry also contains call activity from act 907. There is no need to display the suggestion list without real-time information, and subsequently update the display with real-time information. In some cases, the poor display performance of a display telephone makes that approach impractical. However, incremental updates of real-time information may still be performed by the loop from act 911 to act 903.

Depending on the embodiment, a TAPI implementation of the invention could be written (in software source code) in one of three modes, one of which is single threaded mode and two of which are multi-threaded modes. The multi-threaded TAPI implementations have an advantage over the single-threaded implementation: the user interface is not locked up (i.e. fails to responds to a user's key stroke or mouse click), while waiting for another computer to provide real time information.

One exemplary TAPI implementation of a telephone call manager of the type described herein uses two separate threads of execution in the telephone call manager: a first thread processes user input (e.g. key strokes and mouse clicks) and handles all updates to the user interface (hereinafter "UI thread"); a second thread performs all interactions with TAPI including processing incoming TAPI events and making all TAPI API function calls (hereinafter "TAPI thread").

The UI thread interfaces with the user, i.e. receives the user's input and updates information displayed to the user. In the case of an active call, the UI thread may update one or two portions (depending on the embodiment) of a screen currently displayed to the user. Specifically, a first portion of the screen displays whether an extension has an active call and how many calls there are. The UI thread actually checks for each call, which extension is the call on, and then totals up the calls on that extension. The UI thread does the same thing for when the call is idle case as well. The UI thread uses a speaker icon to indicate that there is at least one incoming call on that extension. A second portion of the screen (if present) contains extended information, wherein the UI thread displays the call state in text form: words are used to describe the state, and also describe information about the connected party.

The UI thread implements a Windows message pump, meaning that it processes messages from Microsoft's Windows operating system and invokes Windows message handlers in response to those messages. Windows messages that are processed by the UI thread include notifications of keystrokes and notifications of mouse clicks that are generated by a user's operation of an input device of the computer, such as a keyboard or a mouse. Therefore, the UI thread of this TAPI implementation is a standard Windows user interface thread in all ways, and is implemented as the main window procedure WndProc.

It is possible to post user-defined messages to the message pump in the UI thread, in order to carry out custom tasks— and this may be done in some embodiments, in order to update the graphical user interface after call events have been received and processed by the TAPI thread.

The TAPI thread of this TAPI implementation is a custom thread that does not run a Windows message pump. Instead, it runs a custom event loop that processes TAPI events as well as user-defined events which are used to make requests to TAPI. In some embodiments, the TAPI thread reduces a large number of interactions with TAPI that would otherwise be generated, one for each extension: specifically, the TAPI thread issues a single request for multiple extensions that are to be monitored.

In some exemplary embodiments, the single request is issued by the TAPI thread to open a multi-line device object in the remote computer, wherein each address in the multi-line device object corresponds to an extension to be monitored. Issuance of a single request to TAPI reduces the overhead that is otherwise incurred if multiple requests to open a device are made, one for each extension. Furthermore, the total number of extensions to be monitored is limited to the maximum number of suggestions (e.g. 25), which reduces the latency between a request and a corresponding response (for real time information).

One illustrative embodiment of the TAPI implementation is outlined in pseudocode in Appendices A-D, which are described next. In this embodiment, there are four states: (a) UI thread decides what extensions to be monitored (b) UI thread tells TAPI that it wants to monitor these extensions (c) TAPI sends to the UI thread events that reconstruct a picture of what's happening on these extensions and (d) UI thread processes the events and updates the user interface.

The just-described UI thread for an illustrative embodiment may be implemented as described in Appendix A, which is written in the form of a message processing function for the Microsoft Windows Operating System. Only those Windows messages that are relevant to the method of FIG. 9A (which is implemented in one exemplary embodiment that is being described) are mentioned in the pseudocode in Appendix A. Source code for one embodiment is provided in Appendix E.

Referring to the UI thread pseudocode in Appendix A, the last function starting is the standard windows function SubclassedWindowProc. The window being subclassed is a standard Windows ComboBoxEx control. There are three messages being received and handled by function SubclassedWindowProc, as follows. Message WM_CHAR is received every time the user presses a character key and the UI thread simply resets the quarter-second timer. The quarter-second timer allows for a single request to be sent to TAPI in the case that the user types several characters in rapid succession.

Message WM_TIMER is received every time the quarter-second timer expires, and the UI thread calls function OnTimer which is the very first function listed in Appendix A. Function OnTimer is called when a quarter-second has passed after the last key stroke, to update a display of a suggestion list based on user input. Specifically, the characters that the user types cause the UI thread to change the list of suggestions.

Referring back to function SubclassedWindowProc (see the bottom of Appendix A), a third message WM_APP_CALLEVENT that is received therein is a custom message that is sent by the TAPI thread when something happens on a given call in the system, and the UI thread calls function OnCallEvent. Function OnCallEvent relates to re-drawing the user interface based on call activity or other real time information. Actual source code for one embodiment can be found in Appendix E.

Appendix A also contains functions OnCallEvent( ) and UpdateExtensionsMonitored( ) which will be discussed later, in relation to "redrawing the UI based on call activity" and "Notifying the call control engine of a change in extensions monitored". As noted above, although there is a quarter-second timeout after typing which must be fulfilled in this example in order to begin the suggestion selection process, other timeouts can be used in other embodiments. The timeout is reset with each keystroke, and is provided to allow for suggestion selection to be done only once after the user finishes typing.

Referring to Appendix B, pseudocode for a TAPI thread is given in the form of a TAPI message processing loop. As illustrated in Appendix B, custom messages used with TAPI use the following C structure:

```
struct SCustomMsg
{
    // custom message identifier—whatever you need
    DWORD dwMsgID;
    // whatever params you need here—just giving examples
    LONG lParam;
    string strParam;
};
#define MSG_CUSTOM_UPDATE_MONITORED_EXTS 1
```

Note that the above-listed structure is defined as a C structure for illustrative purposes, instead of C++ classes which would normally be used. The above-listed structure provides an open ended definition: a message ID, a generic integer parameter and a generic string parameter. Also, an example message ID is defined for the request to monitor a list of extensions. This structure is used to ask TAPI to change the extensions that are to be monitored (e.g. as the suggestions change in response to user input). The values in this custom message are passed to TAPI later. The actual implementation of one embodiment is illustrated in Appendix F.

As illustrated in Appendix B, an additional structure SCall is declared to store information about calls tracked by the application:

```
struct SCall
{
    HCALL hCall;
    HLINE hLine;
```

```
    DWORD dwAddressID;
    DWORD dwCallState;
    string strConnectedName;
    string strConnectedNumber;
    // whatever else you care to store about calls
};
```

Note that several parameters, namely hCall, hLine and dwAddressID are used by TAPI for identifying the line device and the call. The TAPI parameters are described in detail in TAPI documentation referenced elsewhere herein, and are briefly described next. The parameter hLine is a handle to a line device (which may be the multiline monitor). The parameter dwAddressID is an address identifier on the given line device. An address identifier is permanently associated with an address. The parameter hCall is a handle to a call that belongs to the hLine line device. The call state of hCall includes commonly known values such as Connected, Offering, On Hold, and Idle.

The above-described structure may contain any number of parameters defined by a service provider, such as dwCallState, strConnectedName and strConnectedNumber that are used to communicate with a multiline monitor. Specifically, in one implementation, the parameter dwCallState is an identifier for the state of a call: connected, on-hold, ringing, idle, outgoing and incoming. The two character strings strConnectedName and strConnectedNumber identify a person at the other end of the call. Source code for one embodiment is presented in Appendix F.

Although the structure of one message is described above, note that additional messages may be processed as per application needs, as illustrated in Appendix B where the "more cases here" comments are located. Some of the other functions declared in Appendix B are discussed later. For more information on the well-known APIs on which this pseudocode is based, see the following:
1) The Microsoft Windows Windowing API, which is part of the Microsoft Windows Platform SDK. See the header file <windows.h>
2) The Microsoft Telephony Application Programming Interface (TAPI) which is also include in the MS Windows Platform SDK. See the header file <tapi.h>
3) The Standard Template Library (STL) which includes templates string, map, queue, and others. The header files are simple the names of the classes—e.g. <string>, <map>, <queue>.
4) The source code for one embodiment in Appendix F and Appendix G Referring to the pseudocode in Appendix B, a mapping between hCalls (which represent call handles) and the call objects to which they refer are mapped by the statement map<HCALL, SCall *> mapCalls. Specifically, the "map" template is a C++ standard template library template, implemented as a binary tree. It allows the TAPI thread to locate objects by a hash key. The TAPI thread provides a key, and receives back a pointer to the object. When a call first appears, the TAPI thread maps the object by its handle, and then as the TAPI thread gets events on that handle, the TAPI thread finds the object very quickly by using the map. And when the call goes idle the TAPI thread removes the call object from the handle. Such a map implements an internal memory representation of all the calls that are being tracked by the TAPI thread at any given point in time.

Referring again to the pseudocode in Appendix B, after the mapping, a critical section is shown being entered. Specifically, a critical section is a Windows data structure that allows implementation of thread safety: when two threads are reading and writing the same data (such as the above-described mapping), the two threads are programmed to enter and leave the critical section.

Next, the TAPI thread pseudocode in Appendix B retrieves information on calls. This activity is made thread safe via returning a copy. Specifically, the parameter hLineApp is returned from TAPI lineInitializeEx, the parameter hEvent is an event handle produced by TAPI lineInitializeEx, and the parameter hWnd is the handle to the window displaying call information from UI level. Source code for one embodiment is included in Appendix F.

Thereafter, the TAPI thread sets up a queue for the custom messages. Custom messages are defined completely within the application and that's how the UI thread tells the TAPI thread to do various things. UI thread posts a custom message to a particular queue of the TAPI thread (see queue<SCustomMsg *> qCustomMsgs in Appendix B), and the TAPI thread processes these messages from the queue.

Such custom messages may cause one to make a TAPI call that completes asynchronously. Specifically, one makes a TAPI call, and TAPI responds with a code saying the call is received and provides an identifier for that TAPI call. When the TAPI thread finishes processing, it generates another event, with a "final" return code and the identifier which is identical to the previously-provided identifier. Thereafter, the custom message is removed from the queue and is used as an asynchronous mapping to hold any buffers that may be required to complete the asynchronous request (i.e. the event with final code). Source code for one embodiment is included in Appendix F.

After the custom message is added into the queue, Appendix B contains a declaration of a function that will be called from within the TAPI event loop (described below). Specifically, a function OnCallMessage to handle individual TAPI messages is declared. Referring to the event loop of the TAPI thread, each cycle there-through does the following: (A) process any events that are queued up by the TAPI service process to the TAPI thread; (B) process any events that are queued up by the UI thread; (C) go to sleep until there is something to process (i.e. a queued event). Specifically, in Appendix B, see the while loop on lineGetMessage, which is a TAPI function that checks for event messages queued by the TAPI service and takes such messages from the front of the queue.

There are five TAPI events that are handled in some embodiments: first three have to do with calls, the next one concerns assignment of MultiLine Monitor addresses to extensions, and the last is an asynchronous API call completion message. The first three messages are processed in an identical manner, by OnCallMessage which is discussed later, and then the TAPI thread does PostMessage to send an event back to the UI thread. The event may take the form of WM_APP_CALLEVENT which is a custom Windows message and it is posted back to the UI thread saying you have new information about a call.

Following the just-described while loops in Appendix B is pseudocode for making a copy of the data so as not to lock up the mutex for very long.

Source code for one embodiment of the just-described methods is included in Appendix F.

In order to generate a list of suggestions from arbitrary user input, the UI thread indexes all known name/number pairs by both name tokens and numbers. The UI thread then searches the index by creating a token range that matches the user input. An index of names is created, by creating a mapping of name tokens to name/number pair objects. The UI thread uses the following object to represent a name/number pair.

```
struct SContactRecord
{
    string strName;
    string strNumber;
};
```
The following mapping is used to index by name tokens:
multimap<string, SContactRecord *> mapByNameTokens;

Every whitespace-delimited token in a contact's name is used to map the contact. For example, "John Smith" is indexed under "john" and "smith". (Assume one's doing a case insensitive index). "Brian Van Buren" is indexed under "brian", "van" and "buren" while "John David Johnson" is indexed under "john", "david", and "Johnson". No attempt is made by such embodiments of the UI thread to guess at whether tokens are first names, middle names, last names, or portions thereof.

To add a record into the index, the UI thread simply separates the name into space-delimited tokens and inserts the record into the index under each token, as illustrated by function InsertIntoNameIndex in Appendix H. To perform a name lookup on a single user-entered token, the UI thread defines a range for the user-entered token and looks up all contacts that are indexed in that range. For example if the user enters "joh" then the UI thread looks for anything indexed by "joh" through "johzzzzzzzzzzzz" inclusive. In the previous sentence, a series of z's have been added to the user input to define the range. The search simply involves starting at the first item in the index greater than or equal to "joh" and ending with the last item that is less than or equal to "johzzzzzzzzzzzz", as illustrated by function FindMatchesForToken in appendix I.

Embodiments that search based on more than one name token, simply apply the same logic, except such embodiments only accept those items that are index with a range generated by ALL of the tokens. Therefore, such embodiments perform the same search as above, except for each object that matches the fist token, these embodiments test to make sure it matches all the other tokens before accepting it as a match. So, "joh da" would match "John David Smith" and "Damon Johnson" but not "John Smith". See the function FindMatcvhesForTokens in Appendix J.

To map by numbers, several embodiments use a similar index. This time, instead of using strings, such embodiments convert the number to a 64-bit integer where certain bits are used to represent parts of the phone number. Here's a breakdown of which bits are used to represent what items of information:

```
// 64 bits.
//0xCCCAAAASSSSSSSSS
// C —country code—highest 12 bits, or 3 hexadecimal digits
// A —area/city code—next 16 bits, or 4 hexadecimal digits
// S—subscriber number or extension—lowest 36 bits, or 9 hexadecimal digits
```

The number +1 (408) 331-3300 would thus be encoded as 0x0010198000328e94; 001 is hexadecimal for the country code 1; 0198 is hexadecimal for the area code 408; 000328e94 is hexadecimal for the number 3313300. By encoding the numbers in this manner, these embodiments easily search for all numbers in a range of country codes, area codes, subscriber numbers, or a combination thereof. To insert a record into the numbers index, these embodiments simply convert the number to a 64 bit integer and add to the index. See function InsertIntoNumberIndex in appendix K.

When looking for suggestions for a given number string, several embodiments apply the following logic:
1) Look for all extensions that begin with the desired input numbers
2) Look for all numbers in local country code and local area code whose subscriber number begins with the input numbers
3) Look for all numbers in local country code whose area code begins with the input numbers
4) Look for all numbers whose country code begins with the input numbers Several embodiments impose an upper limit on the number of matches, say 25. The following example assumes that we are in country 1 (US), area code 408 (San Jose, Calif.), and that extensions are of length 4.

See function FindMatchesForNumberToken in Appendix L.

Finally, function UpdateSuggestions is illustrated in pseudocode in Appendix M assuming the entries are presented in the user interface using a Win32 List control, which is handles using the MFC CListCtrl class. Source code in the language C++ for one embodiment of the above is included in Appendix G.

Translating user input to a list of extensions can be performed in any of a number of ways that will be apparent to the skilled programmer. The details of such implementations depend upon the details of the user interface implementation. An exemplary embodiment is discussed next.

Assume that the CListCtrl (MFC List Control class) contains items whose ItemData is a pointer to an associated SContactRecord object (it has a name and a number). Also assume that there exists a function "IsExtension" to tell that a given number is an extension or not (e.g. by comparing the number to be checked against a list of all extensions known to be in the system). The comparison could be done after conversion of the extension string into an integer. The function IsExtension( ) is implementation-dependent and pseudocode therefore is apparent to the skilled programmer in view of the disclosure. Function UpdateExtensionMonitoring( ) is defined in pseudocode form in Appendix N. This pseudocode puts together a list of everything that is an extension, and then calls function UpdateExtensionMonitoring which is discussed next.

Function UpdateExtensionMonitoring is one embodiment for the UI thread to inform the TAPI thread of a new list of extensions to be monitored. This function UpdateExtensionMonitoring (see following pseudocode) creates a SCustomMsg which goes between threads, by taking a list of extensions and passing them into a semicolon delimited string, and putting the message into the TAPI thread. Then function UpdateExtensionMonitoring does a PostCustomMessage to send this message/to the UI thread. Function PostCustomMessage was declared in the TAPI message loop of Appendix B.

See the pseudocode for function UpdateExtensionMonitoring in appendix O. Source code for one embodiment of this function and its usage is included in Appendix E and Appendix G.

The TAPI thread sets the extensions to be monitored using a multiline monitor device that exists in a computer that interfaces with a telephony switch, using the event handler defines in the TAPI message loop of Appendix B. Pseudocode for that implementation is illustrated in Appendix C. The structures referenced in the pseudocode are defined in Appendix F.

Also note that Appendix C provides an implementation of OnLineReply( ) which was declared in the TAPI message loop in Appendix B.

Referring to Appendix C, a function SetMLMExtensions is used by the TAPI thread to set the monitored extensions, e.g. by informing a multiline monitor that is implemented in a computer (called "monitoring computer") which is different from a programmed computer in which the TAPI thread is executing (also called "user computer"). Function SetMLMExtensions defines a data structure STLINE_SETMONITOREDDNS which is itself defined in source code for one embodiment included in Appendix F. Information in this structure is passed via TAPI to the service provider. The service provider decodes this structure and uses it.

Specifically the statement pLineDevBuf->dwFunction=STLINE_SETMONITOREDDNS in Appendix C is setting the function to be called on the server side and the next statement is just doing version negotiation between the programmed computer and a server computer. Thereafter, pLineDevBuf->dwDNsSize and pLineDevBuf->dwDNsOffset are set to identify the beginning of the buffer and how big it is.

Next, the pseudocode in Appendix C copies the semicolon delimited string into the buffer, followed by making the TAPI call to set the extensions (in the multiline monitor device). The variable "rc" is used to temporarily hold the return value from LineDevSpecific, either a positive number meaning the function will be completed asynchronously, or a negative number meaning an error occurred (in which case the memory buffer should be deallocated).

When variable "rc" in the pseudocode in Appendix C has a positive result, the pseudocode adds a pointer to the memory buffer that is allocated to the custom message and maps the completion identifier and the custom message so that the reply is properly handled. Note that TAPI requires that calling applications own and make available the buffer in which the string and other information are stored. Specifically, the following statement in Appendix C pCustMsg->lParam=(long)pBuf is storing a pointer to that buffer in the custom message, and by putting in the mapping there is an assurance that the pointer will be around and valid until TAPI provides the completion identifier.

Referring to Appendix C, a function OnLineReply is invoked to process an "is done" message from TAPI (which includes the completion identifier). This function is called when TAPI finishes processing a request to change the list of monitored extensions. The reply ID is the same value as the value returned from the lineDevSpecific call that originated the request. The completion identifier is obtained in variable "rc", which should be 0 for success and some negative number for failure. On success, there is nothing to do except to clean up the buffer memory that was previously allocated and the messages. Of course, a failure case needs to handle the error in the normal manner.

In the "else" statement, one can implement all the rest of TAPI logic for anything else that might need to be done that requires asynchronous completion: e.g. if the application tries to answer the phone call, then the asynchronous event will be processed in the "else" clause. After a successful configuration of the list of monitored extensions using lineDevSpecific is completed by the monitoring computer, a series of LINE_ADDRESSSTATE event messages will typically be sent to the user computer. These messages are processed by the TAPI thread's event loop as illustrated in Appendix B; pseudocode for one embodiment's handling of this event is suggested in Appendix D. Moreover, pseudocode for function OnLineAddressState( ) is provided in Appendix P. The AddressID to Extension relationship is maintained by another STL map which simply indexes the extensions by their address ID. Source code for one embodiment of the above is included in Appendix F.

In several embodiments, the TAPI thread receives call state events from TAPI and updates internal state as illustrated by the pseudocode in Appendix D. Once the multiline monitor has been set to monitor the desired extensions, TAPI sends call events LINE_APPNEWCALL, LINE_CALLSTATE and LINE_CALLINFO for any existing calls. These events carry information about state changes on the calls and sometimes suggest to the application that it should requery TAPI for certain data on the calls. Appendix B (which illustrates the TAPI message loop) shows these events being handled and funneled into the OnCallMessage handler which is illustrated in Appendix D. Also, some of the call mapping, and lookup functions are shown in Appendix D, along the lookup function GetCall( ) which provides thread safe access (e.g. via mutex) for the UI thread. Source code for one embodiment is included in Appendix F.

Message LINE_APPNEWCALL is used by TAPI to tell an application (e.g. the TAPI thread) that there is a call on the system that is new to the application: either the call is in fact new, or may be the application just started monitoring the extension on which the call appears. All the application needs to do is add the call to the mapping (e.g. by creating an object, putting the created object into the mapping, and resetting the first three values that are in the SCall object based on the parameters of the message LINE_APPNEWCALL.

When a user types "mik" into a dialer bar, then the user interface automatically generates and shows all extensions that have a name matching to the "mik" token. And the UI thread eventually puts together a list of semicolon delimited extensions and sends the list to TAPI (via the TAPI thread). TAPI receives the list and sends an asynchronous reply that it received the list fine. Then, if the user is on a call right now, TAPI thread sends a message LINE_APPNEWCALL and each parameter in the handle to the multiline monitor (via TAPI). The dwAddressID parameter is set to the address id of the user's extension in particular. The extension can be gleaned from the dwAddressID using a lookup in a mapping, and example of which is provided in Appendix D in the pseudocode function GetExtensionByAddressID( )

For every line for which the TAPI thread has a subscription, the TAPI thread is notified. If there are 25 mikes in the list, and if there are 10 of them currently on call, the TAPI thread gets 10 TAPI messages LINE_APPNEWCALL. And it's the dwAddressID parameter which allows the TAPI thread to tell which extension these calls are on. The hLine parameter is the same for all of them because that's just a handle for the multiline monitor itself.

Each call has at least 2 legs: one leg for each user on the call. Suppose there are 25 mikes and if mikes 1-5 are talking to mikes 6-10, and there are only 5 calls going on. But there are 10 call legs and TAPI thread will get 10 messages LINE_APPNEWCALL. Each message represents one of the legs, and is just an identifier used to locate information on that leg. LINE_APPNEWCALL simply says here's a call that the TAPI thread should be interested in, and allows performance of initialization (which in our case is mapping of an object). Source code for one embodiment's handling of LINE_APPNEWCALL is included in Appendix F.

The hLine is an identifier for the multiline monitor, and it remains the same regardless of whether the user typed "mike" or "clark". Opening and closing the hLine is expensive in Microsoft's TAPI, but the inventors found that configuring the hLine to watch different dwAddressIDs is cheap, and for this reason a multiline monitor is implemented in a monitoring computer.

The message LINE_CALLSTATE has as one of the parameters (the call handle) that one gets in LINE_APPNEWCALL so that one can identify the call. The other two parameters are the state and the substate. If the state is idle on the call, then one removes it from the mapping. If state is anything but idle, one looks up the call in the mapping, and updates its state. Source code for one embodiment's handling of LINE_CALLSTATE is included in Appendix F.

The message LINE_CALLINFO is very much like message LINE_CALLSTATE except that it's for extended information on the call, e.g. identity of the calling party of a call currently in progress. One difference between these two messages is that message LINE_CALLSTATE carries all the information that the TAPI thread needs to process the message. The message LINE_CALLINFO simply indicates that a change has happened in the information that is kept by TAPI. It tells the TAPI thread what type of information was changed, but the TAPI thread needs to make a TAPI call back to retrieve the information itself.

A function to use the message LINE_CALLINFO looks at the event, checks if one of the fields the TAPI thread is interested in had changed and if so does a TAPI call to lineGetCallInfo. And in doing so, the TAPI thread creates a buffer and provides it to TAPI to fill it in, and then the TAPI thread weeds out the information it is not interested in. Source code for one embodiment's handling of LINE_CALLINFO is included in Appendix F.

At the bottom of FIG. 2C is a statement "Remote Hold: Evil Empire: Workgroup—599", wherein the "Remote Hold" is the call state, and the "Evil Empire: Workgroup—599" is the connected party. To get the connected party, one needs to process message LINE_CALLINFO and do the call back. When message LINE_CALLSTATE is processed, one only gets the state, which is "Remote Hold". The definition of call state in TAPI is limited to the state of the call within the switch: whether the call is on hold, ringing etc. The definition of call information in TAPI covers connected party, originating party, dialed party etc.

Call state could change but call info may remain unchanged and vice versa, e.g. if the called party is put on hold, none of the descriptive information changes. It could also happen the other way around: if a user were to transfer the caller to another person's desk, then the call state of the caller remains connected but who that caller is connected to changes.

As noted above, as new real time information becomes available, the user interface is redrawn, based on the latest call information After the internal state is updated using OnCallMessage( ) the TAPI thread posts a message to the UI thread, alerting it about the presence of the updated information. See TAPI thread pseudocode in Appendix B. The OnCallEvent( ) function declared for use by the UI thread may be implemented as follows.

```
void OnCallEvent(HCALL hCall)
{
  SCall oCall;
  If (GetCall(hCall, oCall) {
  // update the UI with new call information
  - // application dependent
  }
  else {
  // call has gone away—remove it from display.
  }
}
```

As noted above, one embodiment of a TAPI implementation of the invention contains a multiline monitor which is an extension of the concept of a single line device supported by TAPI. A multiline monitor acts as if there is a multiline phone instead of a single line phone. Moreover the multiline monitor abstracts the whole PBX system as one TAPI line device, and can be used for monitoring all the extensions in the system or only a subset thereof for example as limited to only suggestions being displayed to the user.

The multiline monitor uses a TAPI line device subscription mechanism, and functions in a similar manner except for the presence of multiple lines. Monitoring a single extension using TAPI requires subscription to that extension: and then the TAPI thread is notified of all calls that are going on at that extension. When the TAPI thread opens extension 4568, then the TAPI thread gets events only about this one extension 4568. So, the multiline monitor is a way to subscribe to events for many extensions but using a single line.

There are certain advantages inherent in use of a multiline monitor of the type described herein. Specifically, opening a TAPI line device is an expensive operation because of its multilayered architecture—which causes a performance issue depending on the number of suggestions being displayed to the user and the frequency with which the suggestions are changed. Use of the multiline monitor ensures that changing the list of extensions to be monitored is a cheap operation and not an expensive one. Because of using TAPI as an interface layer, monitoring of multiple extensions becomes complicated, whereas in the absence of TAPI the monitoring of multiple extensions can be implemented in a much simpler fashion.

One TAPI implementation uses only one multiline monitor, which is exposed to TAPI as if it were a single line device. Certain properties of multiline monitor are passed transparent to TAPI. Specifically, each line device has a "name" field which is transparent text sent through TAPI. TAPI doesn't know that a multiline monitor is being accessed. Across the two sides of TAPI the same name is used to identify that this is a multiline monitor.

The TAPI thread uses a variable length data structure SCustomMsg (discussed above) to assemble the data to be sent to the multiline monitor via TAPI. Specifically, as noted above, this structure contains an identifier saying which device specific function is being called, data for trace logging, and a string of comma separated extensions (i.e. the list of suggestions) that are to be monitored. These parameters are passed transparently through TAPI, which passes blocks of binary data from and to the TAPI thread. This information eventually is handed off by TAPI to a remote Tapi Service Provider (TSP) and the remote TSP talks to a driver (in a programmed computer at the user's desk).

The function to be performed by the driver is a function that is written to the TAPI standard. The function uses the same data structure that was used by the TAPI thread to decode the data that is received from the TAPI thread. The driver identifies the function to be performed, and looks at the size of the data that is received, and interpret the string of comma separated extensions. The driver then passes all the received data to another computer (called "monitoring computer") that interfaces with a telephony switch and maintains status of all calls at all extensions in the system, as discussed below.

In the above-described TAPI implementation, various software programs such as the UI thread and the TAPI thread and the driver are implemented in a user's desktop PC. Whenever the user's desktop PC starts up it connects to the monitoring computer using remote procedure call (RPC). And the user's desktop PC says here's my extension (through TAPI and TSPI). (code extracted from tms/ncc/ncctsp/nccprov.cpp with functions Connect and SetBoundDNs in Appendix Q). The user's desktop PC tells the monitoring computer the extension of a phone that is on the user's desktop.

The monitoring computer gives a connection identifier back, saying here's a handle for controlling all these remaining operations for this connection. Then the monitoring computer internally creates one more line, and tells the user that this is a special monitoring line to be used for just in time monitoring of real time information on other extensions. So the monitoring computer creates two handles: one is a normal handle created for any TAPI application, and another for monitoring a line that is also created by monitoring computer and handed to the user's desktop PC. (code extracted from tms/ncc/ncctsp/nccconnection.cpp with method CUserConnection::SetBoundDNs that calls NewTapiOwnedLineForEntry and instantiates new CTapiMonitoredLine in Appendix Q).

Whenever the user types in a name, as noted above, the UI thread in user's desktop PC creates a list of extensions that it wants to monitor, and gives the list to monitoring computer. (code extracted from tms/ncc/ncctsp/ncclstpartyline.cpp in Appendix Q) The monitoring computer searches internally to see if there exists a call object—and if so, says these are the extensions for which we have information among the extensions you are trying to monitor. And based on that information, the user's desktop PC obtains real time information based on the call object.

In one embodiment, the monitoring computer gets a subscription request from the user's desktop PC, containing more than one extension. (See the array bsDNs in the previously referenced file in Appendix Q) The monitoring computer validates the extensions. If the user's desktop PC wants to turn off the monitoring then it sends a list of zero. Suppose the user's desktop PC sends 10 extensions, then the monitoring computer validates the extensions (this is optional). Then the monitoring computer finds the lines for the extensions that the user's desktop PC has sent, and associates those lines with the monitored object. (code extracted from tms/ncc/ncctsp/nccconnection.cpp with CTapiMonitoredLine::SetBoundMonitoredDNs in Appendix Q)

For each port in each telephony switch that it is connected to, the monitoring computer creates a line object including: a dialing number (DN), a user name, the location of the switch, the number of rings before voice mail kicks in, etc. See the code extracted from tms/ncc/ncctsp/tsp.h with structure CNccLine in Appendix Q. Each line object has a pointer to CBindingMapEntry object (see code extracted from tms/ncc/ncctsp/tsp.h in Appendix Q) that contains a list which points to call objects that are associated with the line object. The list of call objects changes dynamically depending on the list of extensions from the user's desktop PC. (See code extracted from tms/ncc/ncctsp/tsp.h with CBindingMapEntry with m_pCallList member in Appendix Q).

The monitoring computer modifies this list in response to requests from the user's desktop PC. In the monitoring computer, there are also objects that are uniquely associated with each desktop PC, and each such object points to a multiline monitor object. (See class CTapiConnection, class CUserConnection: public CTapiConnection, class CTapiLine, class CTapiOwnedLine: public CTapiLine, and class CTapiMonitoredLine: public CTapiLine in Appendix Q). Note that the monitoring computer doesn't care about whether the TAPI client is within a user's desktop PC or somewhere else.

Each call object (class CNcclstPartyCall in Appendix Q) contains a caller's identity, and a callee's identity. The state (ringing, established etc) of the call is also present in each call object. The multiline monitor object (class CTapiMonitoredLine: public CTapiLine in Appendix Q) for each user's desktop PC contains pointers to line objects of interest to the user. When a list of extensions is to be monitored, the monitoring computer searches its list of all lines, and finds the requested lines and generates a list for the multiline monitor object for that user's desktop PC. Then the initial state for each line object is handed over to the user's desktop PC.

The user's desktop PC may increase or decrease the list of extensions, and monitoring computer modifies its list and relays the "initial state" back to the user's desktop PC. If there are 3 extensions and after the initial state is received, and if someone hangs up then the call object state is changed to idle, and this information into the monitoring computer comes from the telephony switch via an RPC. The switch says that there is no longer active call on this line. As this line is associated with a multiline monitor object, monitoring computer replicates the same event back to the user's desktop PC.

Numerous modifications and adaptations of the embodiments described herein will be apparent to the skilled programmer in view of the disclosure. For example, in some embodiments, although such additional information on a specific suggestion may in fact change rapidly in real time, the additional information that is displayed to a user is not automatically updated in real time, e.g. because of implementation issues such as processing speed and network latency. In other embodiments however, the display of additional information to the user happens in real time (i.e. without any delay that is noticeable by the user). In some embodiments, in the absence of real time information, an appearance of real time display is created, e.g. a default state is displayed prior to receipt of real time information, and the default state is selected be identical to another state (e.g. idle state). In such an example, when the real time information is received, and if the state is other than idle, the user sees a state change although in fact there was no change in state.

Numerous such modifications and adaptations of the embodiments described herein are encompassed by the attached claims.

The invention claimed is:

1. A method implemented at least partially in a first apparatus, the method comprising:
the first apparatus displaying a plurality of first rows including at least one first row indicative of a first call state of a first telephone call at the first apparatus, as incoming thereto;
the first apparatus receiving input in a dialog box;
the first apparatus automatically identifying at least a name of a person, by using at least said input;
the first apparatus obtaining from at least one source on a network, information corresponding to at least the person identified by the name;
the first apparatus displaying a suggestion list comprising a plurality of second rows based on multiple persons identified by use of the input, at least one second row in the plurality of second rows comprising at least the name of the person, the first apparatus further displaying an icon indicative of a second call state of a second telephone call incoming at a second apparatus of the person identified in said at least one second row;
the first apparatus repeatedly responding to additional input in the dialog box by re-drawing the suggestion list to display at least a subset of second rows selected from among the plurality of second rows, the subset of second rows comprising names of a subset of persons in the plurality of persons and icons corresponding to the names, the subset of persons being selected by the first apparatus by using at least a combination of the input and the additional input;

the first apparatus re-drawing the suggestion list without receipt of the additional input in the dialog box, to display updated information comprising the second call state of the second telephone call;

the first apparatus re-drawing at least the first call state in the first row in response to the first telephone call being answered at the first apparatus; and the first apparatus dialing the second apparatus in response to selection of said at least one second row in the suggestion list.

2. The method of claim 1 wherein:
at least one of said first apparatus and said second apparatus comprises a computer.

3. A first apparatus for interfacing with a user, the first apparatus comprising:
means for displaying a plurality of first rows including at least one first row indicative of a first call state of a first telephone call at the first apparatus, as incoming thereto;
means for receiving input through a dialog box;
means responsive to input in said dialog box, for automatically identifying at least a name of a person;
means for obtaining from at least one source on a network, information corresponding to at least the person identified by the name;
means for displaying a suggestion list comprising a plurality of second rows based on multiple persons identified by use of the input, at least one second row in the plurality of second rows comprising at least the name of the person;
means for displaying an icon indicative of a second call state of a second telephone call incoming at a second apparatus of the person identified in said at least one second row;
means for repeatedly responding to additional input in the dialog box by re-drawing the suggestion list to display at least a subset of second rows selected from among the plurality of second rows, the subset of second rows comprising names of a subset of persons in the plurality of persons and icons corresponding to the names, the subset of persons being selected by the first apparatus by using at least a combination of the input and the additional input;
means for re-drawing the suggestion list without receipt of the additional input in the dialog box, to display updated information comprising the second call state of the second telephone call;
means for re-drawing at least the first call state in the first row in response to the first telephone call being answered at the first apparatus; and
means for dialing the second apparatus in response to selection of said at least one second row in the suggestion list.

4. The apparatus of claim 3 wherein:
said suggestion list further comprises an indication of Instant Messaging (IM) presence of at least another person.

5. The apparatus of claim 3 wherein:
the means for receiving comprises a pointing device and a folder list.

6. The apparatus of claim 3 wherein:
the means for receiving comprises a keyboard.

7. The method of claim 1 wherein:
at least one of said first apparatus and said second apparatus comprises a phone.

8. The method of claim 1 wherein:
the first apparatus replaces said icon with another icon subsequent to the second telephone call being placed on hold, at said second apparatus of said person.

9. A method implemented in an apparatus, the method comprising:
the apparatus obtaining a first set of records from a network, wherein each record in the first set comprises a first name and a last name of a person, and wherein the apparatus further comprises a second set of records maintained locally independent of the first set of records;
the apparatus receiving at least a first numeral in a dialog box;
the apparatus automatically using at least the first numeral to select a first subset of records from among all records comprising the first set and the second set;
the apparatus using at least telephone extension numbers to identify from among the first subset, a first plurality of monitorable suggestions;
the apparatus sending at least one query to at least one source on a network, to request telephony call state for only said first plurality of monitorable suggestions;
the apparatus displaying on a screen comprising said dialog box, a first list comprising multiple suggested callees included in said first plurality of monitorable suggestions, each suggested callee being identified on the screen by the first name, the last name, and a telephone extension number obtained from a record identified in the first subset of records;
the apparatus receiving at least a second numeral in said dialog box;
the apparatus automatically selecting a second subset of records based on use of at least the first numeral and the second numeral, the records in the second subset being fewer in number than in the first subset;
based on the second subset, the apparatus drawing a second list of multiple suggested callees on the screen, to replace the first list on the screen;
the apparatus displaying on said screen, an icon indicative of a call incoming to a suggested callee after receipt of at least one response to said at least one query;
wherein the first list is displayed without waiting for receipt of said at least one response, to avoid delay in displaying the first list;
the apparatus receiving a user selection identifying said suggested callee; and
the apparatus dialing the telephone extension number of the suggested callee identified by the user selection.

10. The method of claim 9 wherein:
the first subset identifies persons having at least a first name that starts with any one of a plurality of first characters identified by use of the first numeral as a dial-by-name digit and further identifies persons having a last name that starts with any one of the plurality of first characters.

11. The method of claim 9 wherein:
on receipt of the first numeral, the apparatus resets a timer of a predetermined time period and updates a display when the predetermined time period has passed after receipt of input in the dialog box, thereby to wait for a timeout of a predetermined time period after receipt of the first numeral, in order to begin performing said automatically using.

12. The method of claim 9 further comprising:
said apparatus drawing a third list on the screen to replace the second list, the third list comprising a third subset of names automatically selected by said apparatus in response to further additional input, third subset of names being selected from among the second subset.

13. The method of claim 9 further comprising:
said apparatus sending another query to an instant messaging server after receiving the first numeral; and
said apparatus subscribing with said instant messaging server prior to said sending.

14. The method of claim 1 wherein:
said first apparatus further displays a numeral in said at least one second row, indicative of a number of calls existing at the second apparatus, wherein the number of calls comprises at least a number of calls currently in progress at the second apparatus.

15. The method of claim 1 wherein:
said first apparatus further displays a numeral in said at least one second row, indicative of a number of calls existing at the second apparatus, wherein the number of calls comprises at least a number of calls in a process of being made to the second apparatus.

16. The method of claim 1 further comprising:
the first apparatus selecting the plurality of persons identified in the suggestion list, based on all telephone extensions in an organization;
wherein the first apparatus obtains the information for only said plurality of persons and not for all telephone extensions.

17. The method of claim 16 wherein:
the plurality of persons identified in the suggestion list comprises a name of a person not identified in a corporate directory of said organization; and
no icon indicative of call state is displayed by the first apparatus, for the person not identified in the corporate directory.

18. The method of claim 1 wherein:
said input comprises a pair of character strings separated from each other by space; and
each person in said multiple persons is identified by the first apparatus, for having a pair of names that match the pair of character strings.

19. The method of claim 1 wherein:
said displaying of the suggestion list is performed prior to receipt of said additional input; and
said icon indicative of the second call state is displayed in said at least one second row of the suggestion list.

20. The method of claim 1 wherein:
the first apparatus automatically uses a mapping, to display said second call state and an indication of instant messenger (IM) presence, of the person identified in said at least one second row of the suggestion list.

21. The method of claim 20 wherein:
the mapping identifies, for the person identified in said at least one second row of the suggestion list, an extension number in a private-branch-exchange (PBX) directory and an instant messenger (IM) address in an IM buddy list.

22. The method of claim 21 wherein:
the mapping comprises a common data item in both the PBX directory and the IM buddy list.

23. The method of claim 1 wherein:
the first apparatus displays in a third row of a screen comprising a plurality of third rows, said icon indicative of said second call state;
the first apparatus displays the screen in response to user selection of said at least one second row;
the first apparatus displays in another third row of said screen, an indication of instant messenger (IM) presence, of the person identified in said at least one second row;
the first apparatus displays in said screen, multiple phone numbers of said person identified in said at least one second row; and
the first apparatus indicates in said at least one second row, all available presence information of the person identified in said at least one second row, including at least instant messenger (IM) presence and telephony call activity.

24. A method implemented at least partially in a first apparatus, the method comprising:
said first apparatus receiving input from a user;
in response to receipt of said input, said first apparatus automatically identifying at least a name of a person;
said first apparatus obtaining from at least one source on a network, information corresponding to at least said person identified by said name;
said first apparatus displaying a control on a screen;
wherein said control comprises at least said name of said person;
wherein said control further comprises a numeral obtained in said information and displayed on said screen said numeral being indicative of a number of calls existing at a second apparatus of said person identified by said name, wherein said number of calls comprises at least one of calls: (A) currently in progress, (B) in a process of being made, and (C) on hold, at said second apparatus of said person.

25. The method of claim 24 wherein:
at least one of said first apparatus and said second apparatus comprises a computer.

26. The first apparatus of claim 3 further comprising:
means for selecting the plurality of persons identified in the suggestion list, based on all telephone extensions in an organization;
wherein the first apparatus obtains the information for only said plurality of persons and not for all telephone extensions.

27. The first apparatus of claim 26 wherein:
the plurality of persons identified in the suggestion list comprises a name of a person not identified in a corporate directory of said organization; and
no icon indicative of call state is displayed by the first apparatus, for the person not identified in the corporate directory.

28. The first apparatus of claim 3 wherein:
the suggestion list is displayed prior to receipt of said additional input; and
said icon indicative of the second call state is displayed in said at least one second row of the suggestion list.

29. The first apparatus of claim 3 further comprising:
means for automatically using a mapping, to display said second call state and an indication of instant messenger (IM) presence, of the person identified in said at least one second row of the suggestion list.

30. The first apparatus of claim 29 wherein:
the mapping identifies, for the person identified in said at least one second row of the suggestion list, an extension number in a private-branch-exchange (PBX) directory and an instant messenger (IM) address in an IM buddy list.

31. The first apparatus of claim 30 wherein:
the mapping comprises a common data item in both the PBX directory and the IM buddy list.

\* \* \* \* \*